(12) United States Patent
Nagara

(10) Patent No.: US 12,556,560 B2
(45) Date of Patent: Feb. 17, 2026

(54) ATTACK ANALYSIS DEVICE, ATTACK ANALYSIS METHOD, AND STORAGE MEDIUM

(71) Applicant: DENSO CORPORATION, Kariya (JP)

(72) Inventor: Keigo Nagara, Kariya (JP)

(73) Assignee: DENSO CORPORATION, Kariya (JP)

( * ) Notice: Subject to any disclaimer, the term of this patent is extended or adjusted under 35 U.S.C. 154(b) by 196 days.

(21) Appl. No.: 18/462,466

(22) Filed: Sep. 7, 2023

(65) Prior Publication Data

US 2024/0089280 A1 Mar. 14, 2024

(30) Foreign Application Priority Data

Sep. 14, 2022 (JP) ................. 2022-146170

(51) Int. Cl.
*H04L 9/40* (2022.01)

(52) U.S. Cl.
CPC ...... *H04L 63/1425* (2013.01); *H04L 63/1416* (2013.01); *H04L 63/1466* (2013.01)

(58) Field of Classification Search
CPC ............. H04L 63/1416; H04L 63/1425; H04L 63/1466
See application file for complete search history.

(56) References Cited

U.S. PATENT DOCUMENTS

| | | | | |
|---|---|---|---|---|
| 11,108,789 B2 * | 8/2021 | Shin | .................. | H04L 12/40169 |
| 11,354,406 B2 * | 6/2022 | Juliato | ................ | H04L 63/1458 |
| 11,363,045 B2 * | 6/2022 | Torisaki | .................. | H04L 67/12 |
| 11,769,415 B2 * | 9/2023 | Yang | ...................... | G08G 1/163 |
| | | | | 340/936 |
| 12,155,682 B2 * | 11/2024 | Torisaki | .................. | H04L 12/40 |
| 2019/0042738 A1 * | 2/2019 | Juliato | .................. | G06F 21/552 |
| 2019/0245872 A1 * | 8/2019 | Shin | ...................... | H04L 63/1425 |
| 2020/0053112 A1 * | 2/2020 | Torisaki | ............. | H04L 63/1425 |
| 2021/0304613 A1 * | 9/2021 | Yang | ...................... | G08G 1/052 |
| 2022/0279005 A1 * | 9/2022 | Torisaki | ............ | H04L 12/40006 |
| 2022/0309153 A1 | 9/2022 | Nagara et al. | | |

(Continued)

FOREIGN PATENT DOCUMENTS

| | | | | |
|---|---|---|---|---|
| EP | 3 490 223 B1 * | 11/2017 | ............ | H04L 29/08 |
| JP | 2014-041506 A | 3/2014 | | |

(Continued)

*Primary Examiner* — Sharon S Lynch
(74) *Attorney, Agent, or Firm* — Harness, Dickey & Pierce, P.L.C.

(57) ABSTRACT

An attack analysis device includes attack abnormality relationship information indicating a relationship among (i) attack information indicating an attack possible to be received by an electronic control system, (ii) an estimation abnormality information indicating an abnormality estimated to be occurred when the attack is received, and (iii) commonized estimation abnormality location information indicating a commonized estimation abnormality location, which is a location of the abnormality estimated to be occurred when the electronic control system receives the attack and commonized between the electronic control system and a different electronic control system. The attack analysis device estimates an attack received by the electronic control system with reference to the attack abnormality relationship information.

24 Claims, 17 Drawing Sheets

| INDIVIDUAL LOCATION | | COMMONIZED LOCATION | |
|---|---|---|---|
| ECU NAME | IDENTIFICATION NO. | LAYER NO. | IDENTIFICATION NO. |
| ECU-A | 0x0001 | 1ST LAYER | 0x01 |
| ECU-B | 0x0002 | 1ST LAYER | 0x01 |
| ECU-C | 0x0003 | 2ND LAYER | 0x02 |
| ECU-D | 0x0004 | 3RD LAYER | 0x03 |
| ECU-E | 0x0005 | 3RD LAYER | 0x03 |

(56) References Cited

U.S. PATENT DOCUMENTS

| | | | |
|---|---|---|---|
| 2023/0283617 A1* | 9/2023 | Tasaki | G06F 21/55 |
| | | | 726/22 |
| 2023/0327956 A1* | 10/2023 | Matsubayashi | H04L 43/0805 |
| | | | 370/254 |
| 2023/0379344 A1* | 11/2023 | Chiba | H04L 67/12 |
| 2024/0223581 A1* | 7/2024 | Takeuchi | H04L 67/12 |

FOREIGN PATENT DOCUMENTS

| JP | 2016-143320 A | 8/2016 |
|---|---|---|
| JP | 2020-123307 A | 8/2020 |
| JP | 2022-153081 A | 10/2022 |

\* cited by examiner

FIG. 5

| INDIVIDUAL LOCATION | | COMMONIZED LOCATION | |
|---|---|---|---|
| ECU NAME | IDENTIFICATION NO. | LAYER NO. | IDENTIFICATION NO. |
| ECU-A | 0x0001 | 1ST LAYER | 0x01 |
| ECU-B | 0x0002 | 1ST LAYER | 0x01 |
| ECU-C | 0x0003 | 2ND LAYER | 0x02 |
| ECU-D | 0x0004 | 3RD LAYER | 0x03 |
| ECU-E | 0x0005 | 3RD LAYER | 0x03 |

1ST LAYER    2ND LAYER    3RD LAYER

1ST LAYER    2ND LAYER    3RD LAYER

FIG. 8
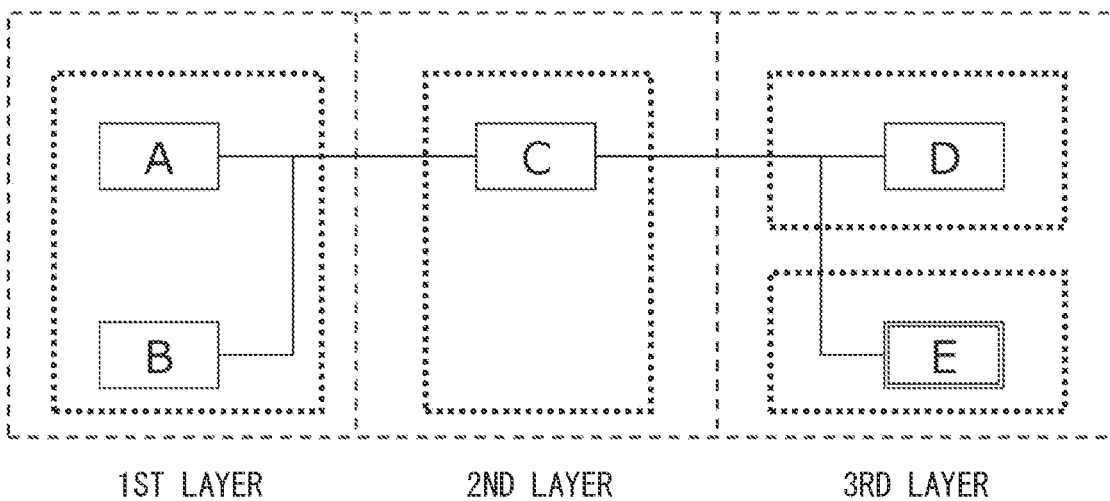
1ST LAYER        2ND LAYER        3RD LAYER
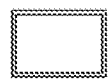 : IMPORTANT PROTECTION RESOURCE
FIG. 9
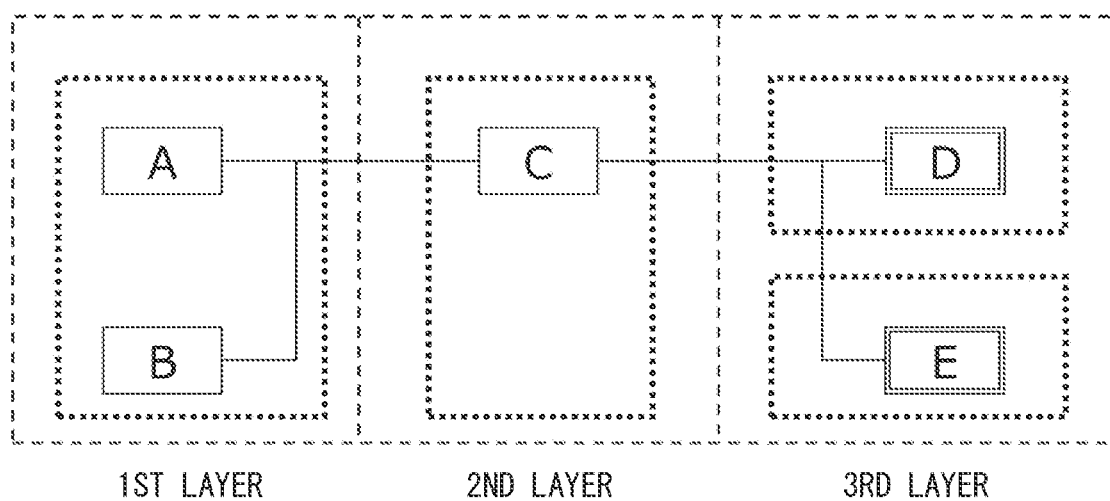
1ST LAYER        2ND LAYER        3RD LAYER
 : IMPORTANT PROTECTION RESOURCE

FIG. 17

| ATTACK INFO | | | ESTIMATION ABNORMALITY INFO / COMMONIZED ESTIMATION ABNORMALITY LOCATION INFO | | | | | | | | | | | |
|---|---|---|---|---|---|---|---|---|---|---|---|---|---|---|
| | | | ABNOR-MALITY A | ABNOR-MALITY B | ABNOR-MALITY C | ABNOR-MALITY D | ABNOR-MALITY A | ABNOR-MALITY B | ABNOR-MALITY C | ABNOR-MALITY D | ABNOR-MALITY A | ABNOR-MALITY B | ABNOR-MALITY C |
| ATTACK TYPE | ATTACK START POINT | ATTACK TARGET | 0x01 | | | | 0x02 | | | | 0x03 | | |
| ATTACK A | 0000 | 0x01 | ○ | — | — | — | — | — | — | — | — | — | — |
| ATTACK B | 0x01 | 0x02 | — | — | ○ | — | ○ | — | — | — | — | — | — |
| ATTACK C | 0x02 | 0x02 | — | — | — | — | — | ○ | ○ | ○ | — | — | — |
| ATTACK D | 0x01 | 0x02 | — | — | — | ○ | ○ | — | ○ | — | — | — | — |
| ... | | | | | | | | | | | | | |
| ATTACK X | 0x02 | 0x03 | — | — | — | — | — | — | — | — | — | ○ | ○ |

ATTACK ANALYSIS DEVICE, ATTACK ANALYSIS METHOD, AND STORAGE MEDIUM

CROSS REFERENCE TO RELATED APPLICATION

The present application claims the benefit of priority from Japanese Patent Application No. 2022-146170 filed on Sep. 14, 2022. The entire disclosure of the above application is incorporated herein by reference.

TECHNICAL FIELD

The present disclosure relates to an attack analysis device, an attack analysis method, and a storage medium, each of which analyzes an attack received by an electronic control system mounted to a moving object, such as a vehicle.

BACKGROUND

In recent years, technologies for driving support and autonomous driving control, including V2X such as vehicle-to-vehicle communication and roadside-to-vehicle communication, have been attracting attention. Usually, vehicles are equipped with communication functions, and vehicles are becoming more connected. As a result, a possibility that a vehicle may receive a cyberattack such as unauthorized access increases. Therefore, it is necessary to analyze cyberattacks on vehicles and to take countermeasures against the cyberattacks.

SUMMARY

An attack analysis device includes attack abnormality relationship information indicating a relationship among (i) attack information indicating an attack possible to be received by an electronic control system, (ii) an estimation abnormality information indicating an abnormality estimated to be occurred when the attack is received, and (iii) commonized estimation abnormality location information indicating a commonized estimation abnormality location, which is a location of the abnormality estimated to be occurred when the electronic control system receives the attack and commonized between the electronic control system and a different electronic control system. The attack analysis device estimates an attack received by the electronic control system with reference to the attack abnormality relationship information.

BRIEF DESCRIPTION OF DRAWINGS

Objects, features and advantages of the present disclosure will become apparent from the following detailed description made with reference to the accompanying drawings.

FIG. 5 is a diagram illustrating a location relationship table according to the first and second embodiments.

FIG. 8 is a diagram illustrating a correspondence between an individual location and a common location according to each embodiment.

FIG. 9 is a diagram illustrating a correspondence between an individual location and a common location according to each embodiment.

FIG. 17 is a diagram illustrating an attack abnormality relationship table according to the first and second embodiments.

DETAILED DESCRIPTION

Figure 1:
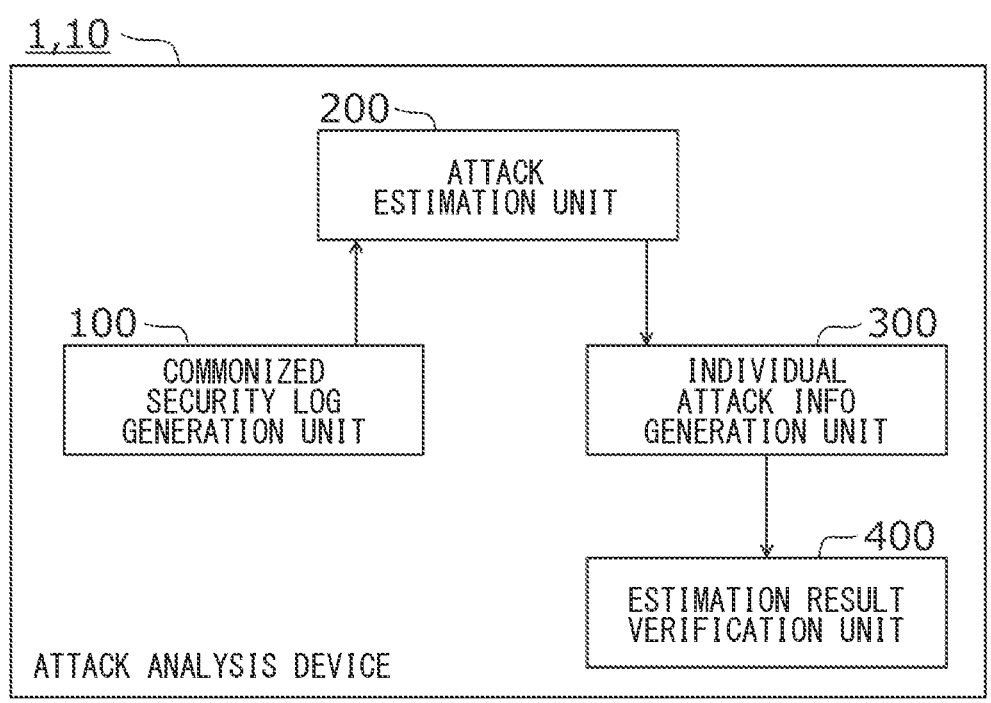
FIG. 1 is a block diagram illustrating a configuration example of an attack analysis system according to a first embodiment.

There have been known various technologies for detecting abnormalities occurred in vehicles and analyzing the cyberattacks based on the detected abnormalities. In a known art, detected abnormality data is collected, and a combination of items in which the abnormalities are detected is compared with an abnormality detection pattern specified in advance for each attack. Then, the type of attack corresponding to the abnormality is specified.

The inventor of the present disclosure has found the following difficulty by his own study in the above-described issue. Since a configuration of a vehicle system mounted on a vehicle varies depending on type, model, and manufacturer of the vehicle, a combination of abnormalities caused by a cyberattack may vary depending on the configuration of the vehicle system. In order to identify a cyberattack using a combination of abnormalities, it is necessary to set abnormality detection patterns and an analysis rule for individual vehicle system.

In recent years, the number of electronic control units constituting an electronic control system has been increasing with an increase in the number of vehicle functions. Therefore, when abnormality detection patterns and analysis rules corresponding to multiple electronic control devices are set, the processing load may increase and development and maintenance may become difficult.

According to an aspect of the present disclosure, an attack analysis device includes a commonized log acquiring unit, which acquires a commonized security log. The commonized security log includes abnormality information and commonized abnormality location information. The abnormality information indicates an abnormality detected in an electronic control system. The electronic control system includes multiple electronic control units. The commonized abnormality location information indicates a commonized abnormality location generated by converting an abnormality location, which is a location of one of the multiple electronic control units where the abnormality is occurred, to a location commonized between the electronic control system and a different electronic control system, according to a protection resource to be protected by the one of the multiple electronic control units where the abnormality is occurred. The attack analysis device includes an attack abnormality relationship information storage unit in which attack abnormality relationship information is stored in advance. The attack abnormality relationship information indicates a correspondence relationship among (i) attack information indicating an attack possible to be received by the electronic control system, (ii) an estimation abnormality information indicating an abnormality estimated to be occurred when the attack is received, and (iii) commonized estimation abnormality location information indicating a commonized estimation abnormality location, which is a location of the abnormality estimated to be occurred when the electronic control system receives the attack and commonized between the electronic control system and the different electronic control system. The attack analysis device includes an estimation unit that estimates the attack received by the electronic control system from a combination of the estimation abnormality information and the commonized estimation abnormality location information, which corresponds to a combination of the abnormality information and the commonized abnormality location information. The attack analysis device includes an output unit outputting the attack information corresponding to the estimated attack.

With the above-described configuration, the attack analysis device according to the present disclosure can estimate and analyze contents of the cyberattack regardless of the configuration of vehicle system mounted on the vehicle when the vehicle system is under cyberattack.

The following will describe embodiments of the present disclosure with reference to the drawings.

Any effects described in embodiments indicate effects obtained by a configuration of one embodiment as an example of the present disclosure, and should not be necessarily interpreted as an effect of the present disclosure.

In the present disclosure, the configuration disclosed in each embodiment is not limited to each embodiment alone, but may be combined across the embodiments. For example, a configuration disclosed in one embodiment may be combined with another embodiment. Further, the disclosed configurations may be collected and combined in each of multiple embodiments.

1. First Embodiment

The following will describe an attack analysis device 10 according to a first embodiment with reference to FIG. 1. The attack analysis device 10 is analyzes a cyberattack on an electronic control system S, which is to be described later. The attack analysis device 10 includes a commonized security log generation unit 100, an attack estimation unit 200, an individual attack information generation unit 300, and an estimation result verification unit 400. In the following embodiments, a system including the attack analysis device 10 is referred to as an attack analysis system. Therefore, FIG. 1 is also a diagram illustrating the attack analysis system 1 according to the present embodiment.

In each of the embodiments described below, an example, in which the electronic control system S to be attacked is a vehicle system mounted in or on the vehicle, will be described. The electronic control system S is not limited to the vehicle system, and may be applied to any type of electronic control system that includes multiple electronic control units (ECUs). For example, the electronic control system S may be mounted on any type of "moving object", or may be mounted on a "stationary object" instead of the moving object.

The term "moving object" refers to a movable object, and a travel speed of the moving object may be arbitrary. The moving object also includes a state where the moving object is in stationary state. Examples of the moving object include automobiles, motorcycles, bicycles, pedestrians, ships, aircrafts, and objects mounted thereon. However, the moving object is not limited to these examples.

The term "mounted" includes not only a case where an object is directly fixed to the moving object but also a case where an object moves together with the moving object although the object is not fixed to the moving object. The term "mounted" also includes a case where the device is carried by a person in the moving object, or a case where the device is mounted on a load located to be carried by the moving object.

Figure 2A:
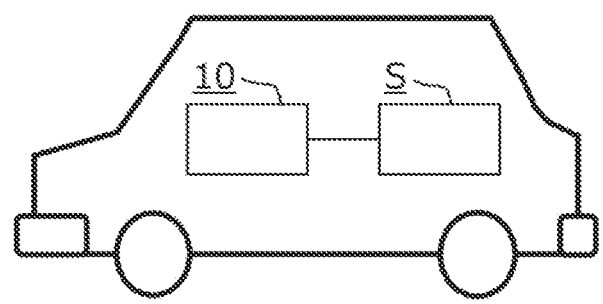
FIG. 2A and FIG. 2B are diagrams each illustrating an attack analysis device according to the first embodiment.
Figure 2B:
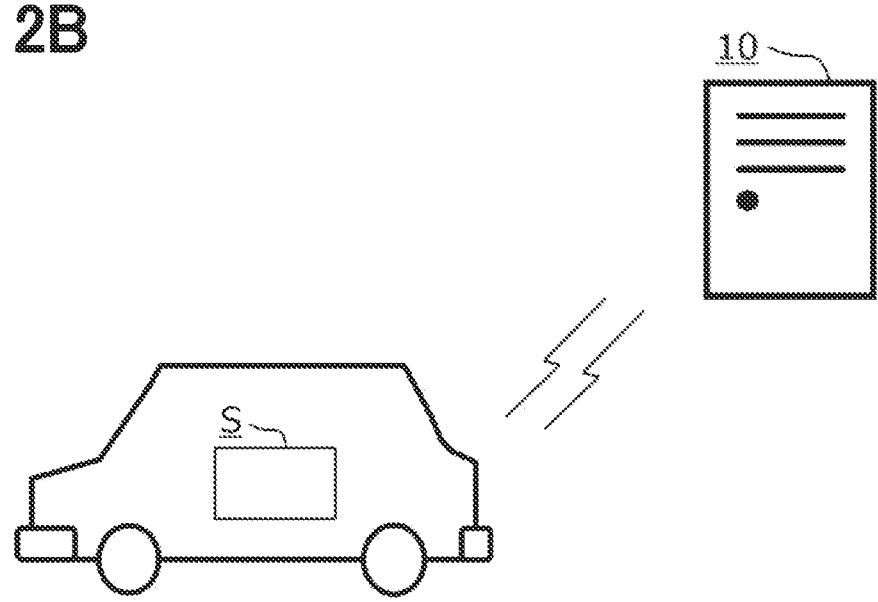

FIG. 2A and FIG. 2B each is a diagram illustrating the attack analysis device 10 according to the present embodiment. In the present embodiment, the attack analysis device 10 may be mounted on a vehicle on which the electronic control system S is mounted as illustrated in FIG. 2A. As another example, the attack analysis device 10 may be mounted on a server device disposed outside of the vehicle as illustrated in FIG. 2B.

As illustrated in FIG. 2A, in a case where the vehicle is equipped with the electronic control system S and the attack analysis device 10, the attack analysis device 10 can analyze the cyberattack without delay in response to the electronic control system S receiving the cyberattack. Thus, the attack analysis device can quickly respond to the cyberattack.

As illustrated in FIG. 2B, in a case where the attack analysis device 10 is on a server device, if an abnormality occurs in the electronic control system S mounted on the vehicle, the server device receives an individual security log, which is detected and generated by a security sensor to be described later, from the vehicle via a wireless communication network. Comparing with the case where the attack analysis device 10 is mounted on the vehicle, it takes time to analyze the attack and feed back the analysis result to the vehicle. However, it is possible to reduce the processing load in the vehicle device.

(1) Electronic Control System S

Figure 3:
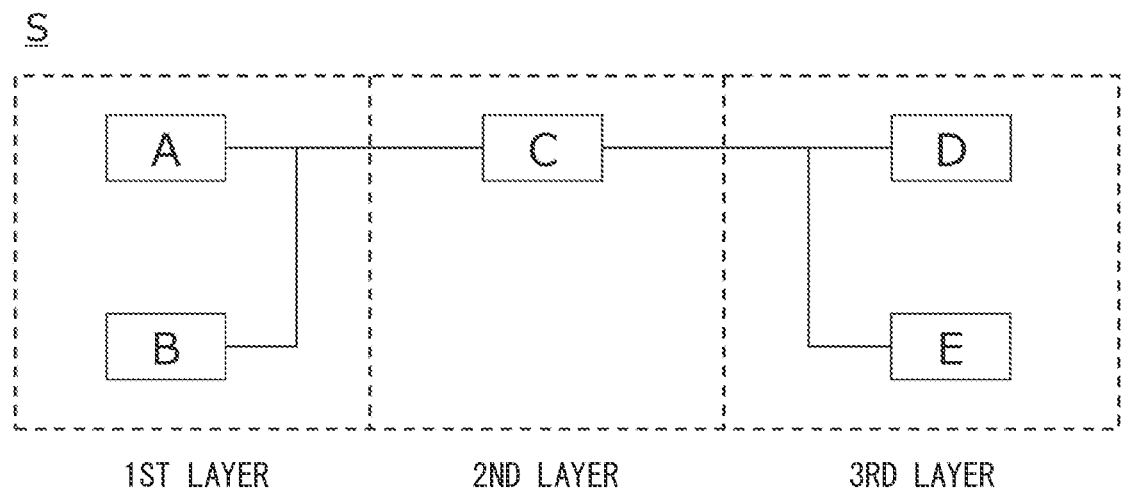
FIG. 3 is a diagram illustrating an electronic control system which received a target attack to be analyzed by the attack analysis device according to the first embodiment and a second embodiment.

The following will describe the electronic control system S with reference to FIG. 3. The electronic control system S includes multiple electronic control units (ECUs). In an example shown in FIG. 3, the electronic control system S includes ECUs A to E, and each ECU is connected with one another through an in-vehicle network. The ECU may be a physically independent ECU, or may be a virtual ECU (known as a virtual machine), which is virtually implemented.

Each ECU configuring the electronic control system S includes one or more security sensors that monitor the inside of the ECU and the network to which the ECU is connected. Upon detecting occurrence of abnormality inside the ECU or in the network, the security sensor generates a security log, and outputs the generated security log to a commonized security log generation unit 100. Hereinafter, the security log generated and output by the security sensor is referred to as an individual security log. The individual security log includes abnormality information indicating an abnormality detected by the security sensor and abnormality location indicating occurrence location of the abnormality detected by the security sensor. The individual security log may further include identification information for specifying the electronic control system S, identification information of the security sensor that has detected the abnormality, identification information of the ECU to which the security sensor is mounted, abnormality detection time, the number of times by which the abnormality is detected, a detection order of the abnormalities, and information about content and IP address of received data (transmission source and transmission target) before detection of the abnormality.

In a vehicle conforming to specification of Automatic Open System Architecture (AUTOSAR), the ECU constituting the electronic control system S is based on a platform known as an adaptive platform (also referred to as AP) or a platform known as a classic platform (also referred to as CP). The adaptive platform has a high computing capability by using a dynamic OS and can easily expand functions, and the classic platform can implement high real-time performance and resource reduction by using a static OS. Similarly, when the ECU is provided by a virtual machine, the ECU is also based on a platform such as an AP or a CP. The AP is mainly suitable for an ECU used for automated driving, and the CP is mainly suitable for an ECU used for vehicle control. The AP is rich in functions and has flexibility of customization. Although the function of CP is restricted, CP is less likely to receive attack from the outside, and thus the CP has high security.

(2) Configuration of Commonized Security Log Generation Unit 100

Figure 4:
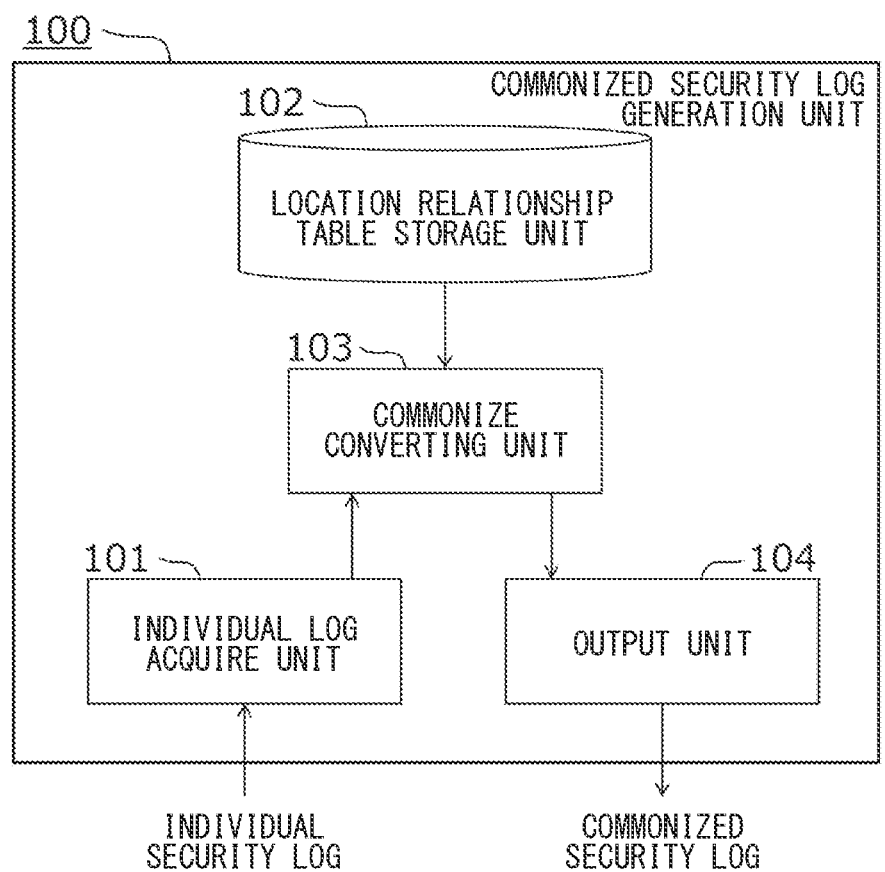
FIG. 4 is a block diagram illustrating a configuration example of a commonized security log generation unit according to the first and second embodiments.

The following will describe a commonized security log generation unit 100 with reference to FIG. 4. The commonized security log generation unit 100 includes an individual log acquiring unit 101, a location relationship table storage unit 102, a commonize converting unit 103, and an output unit 104.

The individual log acquiring unit 101 acquires an individual security log, which includes (i) abnormality information indicating an abnormality detected by the electronic control system S and the (ii) abnormality location information indicating a location where the abnormality is occurred.

The location relationship table storage unit 102 (corresponding to a location relationship information storage unit) stores a location relationship table (corresponding to location relationship information) indicating a correspondence relationship between (i) an individual location, which is a location of each of multiple ECUs constituting the electronic control system S, and (ii) a commonized location, which is a location obtained by commonizing the individual location between the electronic control system S and another electronic control system. The individual location corresponds to a location obtained by individualizing the commonized location to a location used in the electronic control system S. FIG. 5 is a diagram illustrating an example of the location relationship table. In the location relationship table illustrated in FIG. 5, each ECU of the electronic control system S illustrated in FIG. 3 and a commonized location of corresponding ECU is stored in association with one another. The storage unit may store information indicating a correspondence relationship between the individual location and the commonized location in different forms other than a table.

The association between the individual location and the commonized location is implemented based on, for example, a security defense layer of the electronic control system, that is, based on security level. In many electronic control systems S, defense in depth is adopted by using multi-layer protection in order to improve security against attacks. By providing the security function in hierarchical and multi-layer protection as a countermeasure to the attack, when one countermeasure (that is, the first layer) is breached in the event of the attack, the next countermeasure (that is, the second layer) can defend against the attack. Thus, it is possible to increase the defense power of the electronic control system. Thus, the electronic control system S using the defense in depth (multi-layer protection) includes multiple layers having different security levels from one another. Thus, the electronic control system S is divided into multiple layers according to the different security levels, and an individual location, which is a location of each ECU in the electronic control system S, is associated with a commonized location by determining each ECU belongs to which layer among the multiple layers. That is, in this example, the commonized location corresponds to a location of defense layer in the electronic control system S.

The term "security level" is an index indicating security against attacks or deterrence against attacks.

The electronic control system S shown in FIG. 3 has three defense layers. In this example, ECU A and ECU B belong to the first layer, ECU C belongs to the second layer, and ECU D and ECU E belong to the third layer. For example, ECU A and ECU B are communication ECUs each having a function of communicating with outside source, and each of these ECUs is equipped with a security function of monitoring data entering from the outside of the vehicle into the inside of the vehicle. In this example, an area monitored by the ECU having such a security function is set as the first layer. The ECU C is, for example, a gateway ECU equipped with a security function of monitoring data communicated between a network of an ECU connected to the outside of the vehicle and a network of an ECU that performs vehicle control. The ECU C performs security countermeasures different from those of the ECU A and the ECU B described above. Thus, an area monitored by the ECU C has a security level different from that of the first layer which is an area protected by the ECU A and the ECU B. Thus, in the present example, the area monitored by the ECU C is set as the second layer. The ECU D and the ECU E are, for example, vehicle control ECUs that control moving of the vehicle. The ECU D and the ECU E are areas in which only data that has passed through the security function of the ECU C is communicated. The area monitored by the ECU D and the ECU E has a security level different from that of the second layer. Thus, these ECUs belong to a layer different from the ECU C, and this layer is referred to as a third layer. In the location relationship table shown in FIG. 5, the name, which is shown in FIG. 3, and the identification number of each ECU are stored in association with the layer number, which is shown in FIG. 3, and the identification number of each ECU.

An ECU (for example, ECU A and ECU B shown in FIG. 3) having a function as an entry point is an ECU connected to the outside of the vehicle, and is highly likely to be attacked from the outside. Thus, an ECU having a function as an entry point may be configured to belong to the first layer, which is defined as a different layer from other layers which other ECUs belong to. When an ECU having a function as an entry point and an ECU not having a function as an entry point belong to the same layer, higher security is required to be set so that other ECUs belonging to the same layer are not attacked when an attack is occurred from the outside.

Note that the configuration in FIG. 3, the defense layer of the electronic control system S of the present embodiment, and the security function constituting the defense layer are merely examples, and the present disclosure is not limited to these examples. For example, the electronic control system S may have four or more defense layers. In a case where two or more ECUs have the same security function, different defense layers may be set by monitoring different data as monitoring targets.

Even when the physical configuration of the electronic control system differs depending on the type of vehicle, common security functions are set in the electronic control system that employs the defense in depth. Thus, the electronic control system having any configuration can be divided into multiple layers according to the security level. The multiple layers correspond to the defense layers defined according to the security function. Thus, by commonizing the location defined in the configuration of the electronic control system as a location belonging to the defense layer, it is possible to process the location (that is, the individual location) of each ECU in the electronic control system S as a location (that is, the commonized location) common to the electronic control system S and other electronic control systems.

In the location relationship table illustrated in FIG. 5, an example in which the individual location of the ECU and the commonized location are associated with one another according to only the security level is described. As another example, the individual location and the commonized location may be associated with one another according to other parameters in addition to or instead of the security level. For example, the individual location and the commonized location may be associated with one another according to a network connected to the ECU. For example, although the ECUs belong to the same security level, the ECUs may be associated with different commonized locations depending on whether the network connected to the ECU is a controller area network (CAN) or Ethernet. The network connected to the ECUs includes not only a network that actually connects the ECUs to each other but also a virtual network that connects virtual machines to each other.

As another example, the individual location and the commonized location may be associated with one another based on the function of the ECU. For example, ECU D and ECU E shown in FIG. 3 belong to the same security level. In a case where the ECU D controls the engine and requires high safety, and the ECU E controls air conditioning and does not require high safety as ECU D, the ECU D and the ECU E may be associated with different commonized locations from one another.

When the ECU is equipped with virtual machines, virtual machines on the same ECU may be associated with different commonized locations. For example, a virtual machine A has a function as an entry point to an ECU for vehicle control purpose and also has a security function, and a different virtual machine B has a function of vehicle control. When the virtual machine A and the virtual machine B are implemented on the same ECU, the virtual machine A and the virtual machine B may be associated with different commonized locations from one another.

The virtual machine and the physical ECU may be associated with different commonized locations from one another. That is, the individual location of the ECU is associated with the commonized location depending on whether the ECU is a physical ECU or a virtually implemented ECU. Since the virtual machine and the physical ECU often have different attack targets and attack routes, when the virtual machine and the physical ECU are associated with the same commonized location, an accuracy of attack analysis may be degraded. Thus, for example, even when the virtual machine and the physical ECU belong to the same layer, the virtual machine and the physical ECU are associated with different commonized locations.

When the ECUs and the virtual machines belonging to the same layer have the function as an entry point, the ECUs and the virtual machines may be associated with the same commonized location.

The function of the ECU may be referred to as a resource to be protected by the ECU, that is, protection resource of the ECU. In the technical field of security, protection resource, which is a target to be protected, may be classified in terms of SFOP, that is, Safety, Finance, Operational, and Privacy. The protection resource related to safety may be, for example, a driving function and a power supply function of the automobile, and these protection resources correspond to the functions of ECUs related to the safety of the automobile and eventually the occupants of the automobile. The protection resource related to finance may be, for example, an automobile itself or a load carried by the automobile. These protection resources are protected by locking windows and doors of the vehicle. Protecting the vehicle and the load is equivalent to protecting the functions of the ECU related to the door lock or window lock. Therefore, the protection resource related to finance corresponds to the function of the ECU related to lock. The protection resource related to operational may be, for example, an application installed in the ECU, and corresponds to a function of the ECU in which such an application is installed. The protection resource related to privacy (personal information) may be, for example, a travel record of an automobile or a moving image or sound captured by a vehicle-mounted camera, and corresponds to a function of an ECU that records data such as a travel record.

The protection resource, which is also called an asset to be protected against the cyberattack, includes not only a tangible resource protected by a function of the electronic control unit but also a function and data of the electronic control unit and software itself installed in the electronic control unit.

In the present embodiment, the individual location of the ECU may be associated with the commonized location according to the protection resource. For example, the individual location of the ECU may be associated with the commonized location according to the content (that is, SFOP) of the protection resource of the ECU. For example, even among the ECUs belonging to the same layer, when one ECU has a protection resource related to safety and another ECU has a protection resource related to finance, these two ECUs may be associated with different commonized locations from one another.

In another example, the individual location of the ECU may be associated with the commonized location according to an importance of the protection resource of the ECU. For example, even for the same safety-related protection resource, it is conceivable that the function related to braking is of high importance, while the function related to speed is of lower importance than the function related to braking. When degrees of importance of the protection resources related to the same safety are different from one another, the protection resource may be associated with different commonized locations according to the importance degree.

It should be noted that protection resource having a high degree of importance may be arranged in the second layer or the third layer of the multi-layer protection structure. The second and subsequent layers are locations protected by multiple security functions (that is, the security function of the first layer and the security function of the second layer), and have higher security than the first layer. Thus, a protection resource having a high degree of importance to be protected is arranged in the second layer or subsequent layer having higher security than the first layer.

As described above, when the ECU includes the AP or the CP, the individual location of the ECU may be associated with the commonized location according to the platform of the ECU. For example, the ECU having the AP and the ECU having the CP may be associated with different commonized locations. Further, important protection resource may be arranged in the ECU including the CP of high security.

The commonize converting unit 103 converts an abnormality location included in the individual security log acquired by the individual log acquiring unit 101 into a commonized abnormality location that is a location common to the electronic control system S and another electronic control system, using the location relationship table stored in the location relationship table storage unit 102. Specifically, the commonize converting unit 103 specifies an individual location in the location relationship table corresponding to the abnormality location in the individual security log, and then specifies a commonized location associated with the individual location. The identified commonized location is a commonized abnormality location.

As illustrated in FIG. 2B, when the attack analysis device 10 is a server device, the commonized security log generation unit 100 acquires individual security logs from a large number of vehicles and generates commonized security logs. Therefore, the location relationship table storage unit 102 needs to store a large number of location relationship tables corresponding to the electronic control systems of the respective vehicles. Therefore, in order to easily specify the location relationship table to be used by the commonize converting unit 103, when the attack analysis device 10 is a server device, the individual security log may include identification information for specifying the electronic control system. Accordingly, the commonize converting unit 103 can easily specify the location relationship table used for converting the abnormality location included in the individual security log.

The output unit 104 outputs, to the attack estimation unit 200 to be described later, the commonized security log including (i) the abnormality information and (ii) the commonized abnormality location information indicating the commonized abnormality location converted by the commonize converting unit 103. In addition to the abnormality information and the commonized abnormality location information, the commonized security log may further include information included in the individual security log, for example, an abnormality location before being converted by the commonize converting unit 103 or information related to the security sensor.

Figure 6:
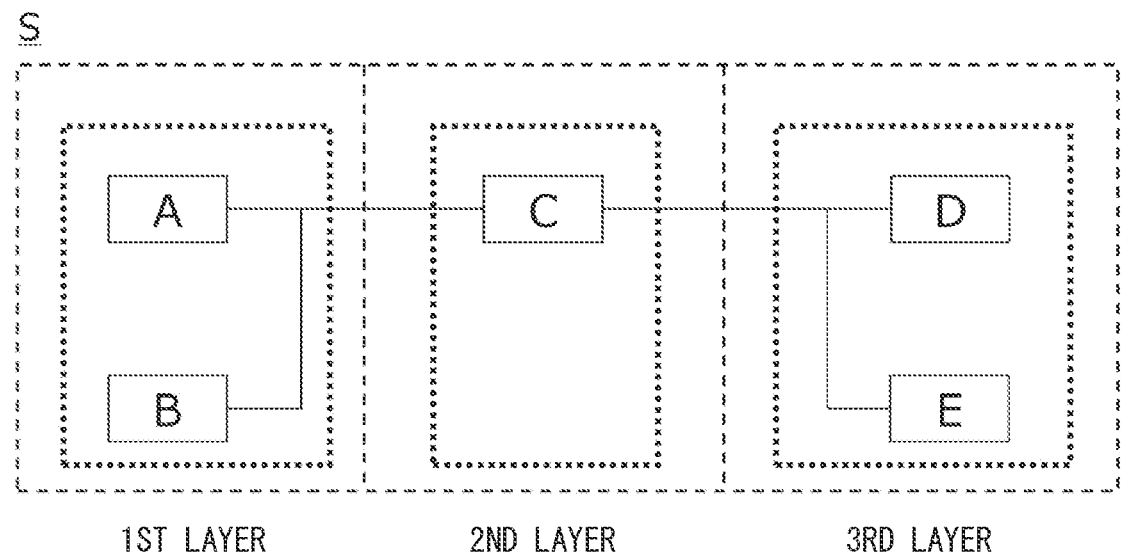
FIG. 6 is a diagram illustrating a correspondence between an individual location and a common location according to each embodiment.

The relationship between the individual location and the commonized location will be described in more details with reference to FIG. 6 to FIG. 15B. FIG. 6 shows an electronic control system S having the same configuration as that of FIG. 3, and FIG. 7 to FIG. 15B each shows an electronic control system S having a configuration different from those of FIG. 3 and FIG. 6. In FIG. 6 to FIG. 15B, the ECUs associated with the same commonized location are surrounded by a broken line.

FIG. 6 illustrates an example in which an individual location of an ECU is associated with a commonized location according to a defense layer to which each ECU belongs. In the example illustrated in FIG. 6, the ECU A and the ECU B belong to the first layer, and the ECU A and the ECU B are associated with the same commonized location. The ECU C belongs to the second layer, and the ECU D and the ECU E belong to the third layer. The ECU C is associated with commonized location different from those of the ECU A and the ECU B. The ECU D and the ECU E are associated with commonized location different from those of the ECU A, ECU B and ECU C.

Figure 7:
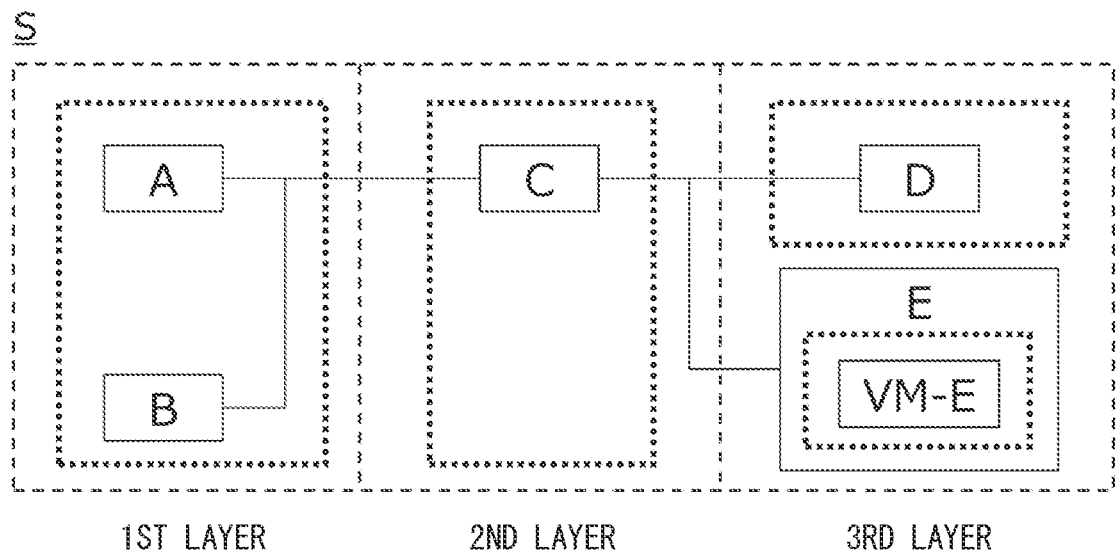
FIG. 7 is a diagram illustrating a correspondence between an individual location and a common location according to each embodiment.

FIG. 7 illustrates an example in which the individual location and the commonized location are associated with one another depending on whether the ECU is a physical ECU or a virtually realized ECU, that is, a virtual machine. In FIG. 7, the ECU D and the virtual machines (VM-E) of the ECU E belong to the same third layer. However, ECU-D, which is a physical ECU, and VM-E, which is a virtual machine, are associated with different commonized locations.

FIG. 8 illustrates an example in which an individual location and a commonized location are associated with one another according to the protection resource in addition to the defense layer to which each ECU belongs. Among ECU A to ECU E, ECU E is an ECU having an important protection resource. In this example, although the ECU D and the ECU E belong to the third layer, the ECU D and the ECU E are associated with different commonized locations.

FIG. 9 differs from FIG. 8 in that ECU D and ECU E have important protection resources. In FIG. 9, although ECU D and ECU E belong to the third layer and both of ECU D and ECU E have important protection resources, ECU D and ECU E are associated with different commonized locations. For example, in a case where the ECU D has the protection resource related to safety and the ECU E has the protection resource related to operational, the ECU D and the ECU E are associated with different commonized locations as illustrated in FIG. 9. Alternatively, when the ECU D and the ECU E have protection resources related to safety and importance of the protection resources are different from one another, the ECU D and the ECU E may be associated with different commonized locations as illustrated in FIG. 9.

Figure 10:
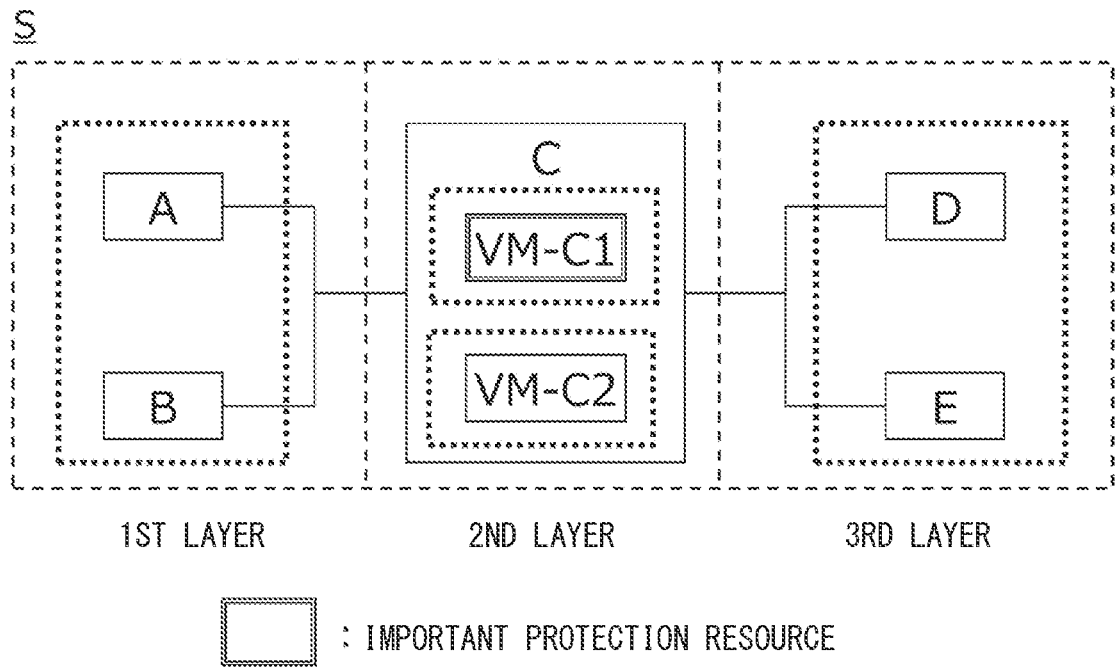
FIG. 10 is a diagram illustrating a correspondence between an individual location and a common location according to each embodiment.

FIG. 10 shows an example in which the ECU C is equipped with two virtual machines VM-C1 and VM-C2, and the virtual machine VM-C1 has important protection resource. Although the virtual machines VM-C1 and VM-C2 belong to the same second layer, the virtual machine VM-C1 has an important protection resource and the virtual machine VM-C2 does not have an important protection resource. In this case, the virtual machines VM-C1 and VM-C2 may be associated with different commonized locations.

Figure 11:
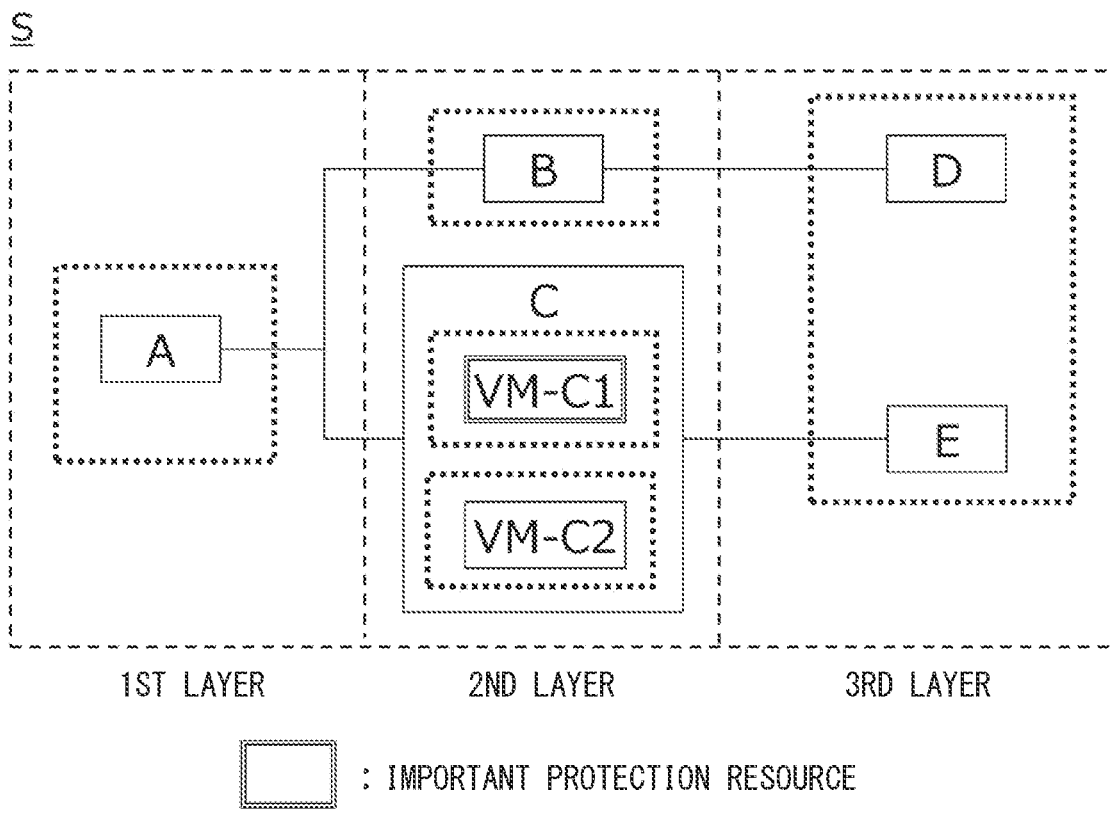
FIG. 11 is a diagram illustrating a correspondence between an individual location and a common location according to each embodiment.

FIG. 11 illustrates an example in which the ECU B and the ECU C belong to the second layer. On the ECU C, two virtual machines VM-C1 and VM-C2 are mounted. In this case, the physical ECU B, the virtual machine VM-C1 having the important protection resource, and the virtual machine VM-C2 not having the important protection resource may be associated with different commonized locations from one another.

Figure 12:
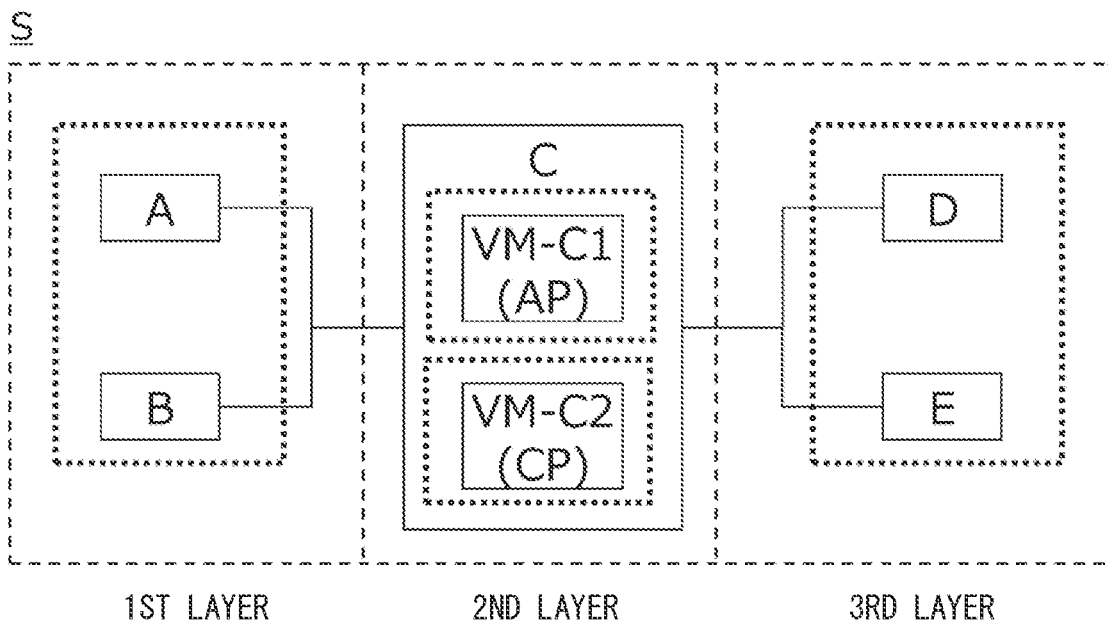
FIG. 12 is a diagram illustrating a correspondence between an individual location and a common location according to each embodiment.

FIG. 12 illustrates an example in which an individual location and a commonized location are associated with one another according to a platform of ECU. In FIG. 12, the ECU C is equipped with two virtual machines VM-C1 and VM-C2, and belongs to the second layer. Both of the virtual machines VM-C1 and VM-C2 do not have important protection resource. The virtual machine VM-C1 has an AP, and the virtual machine VM-C2 has a CP. In this case, the virtual machines VM-C1 and VM-C2 illustrated in FIG. 12 may be associated with different commonized locations.

Figure 13:
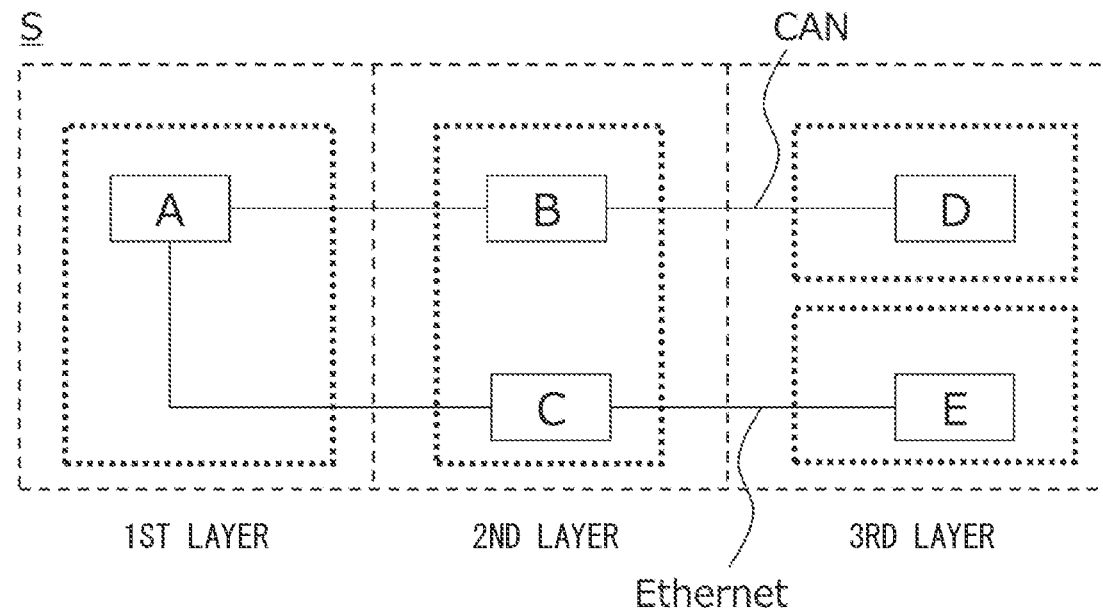
FIG. 13 is a diagram illustrating a correspondence between an individual location and a common location according to each embodiment.

FIG. 13 illustrates an example in which an individual location and a commonized location are associated with one another according to the network to which the ECU is connected, in addition to the defense layer to which each ECU belongs. In the example shown in FIG. 13, the ECU D is connected to the CAN, and the ECU E is connected to the Ethernet. Thus, the ECU-D and the ECU-E are associated with different commonized locations.

Figure 14:
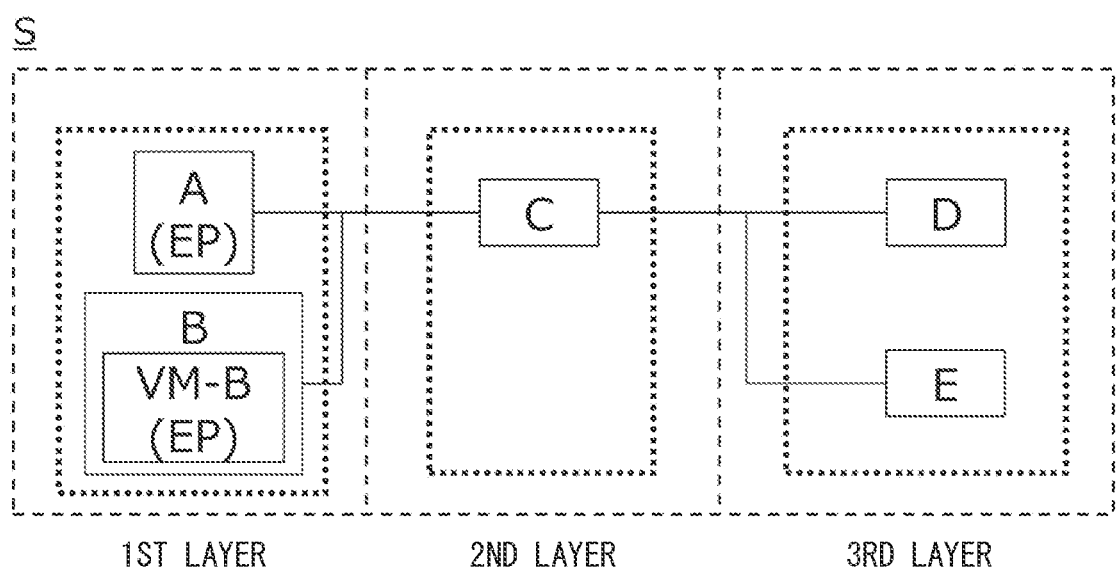
FIG. 14 is a diagram illustrating a correspondence between an individual location and a common location according to each embodiment.

FIG. 14 illustrates an example in which the ECU A and the virtual machine VM-B of ECU-B belong to the first layer. In this example, ECU A, which is a physical ECU, and VM-B, which is a virtual machine, are associated with the same commonized location. Since both ECU A and virtual machine VM-B have the function as an entry point, they are associated with the same commonized location in the example of FIG. 14.

Figure 15A:
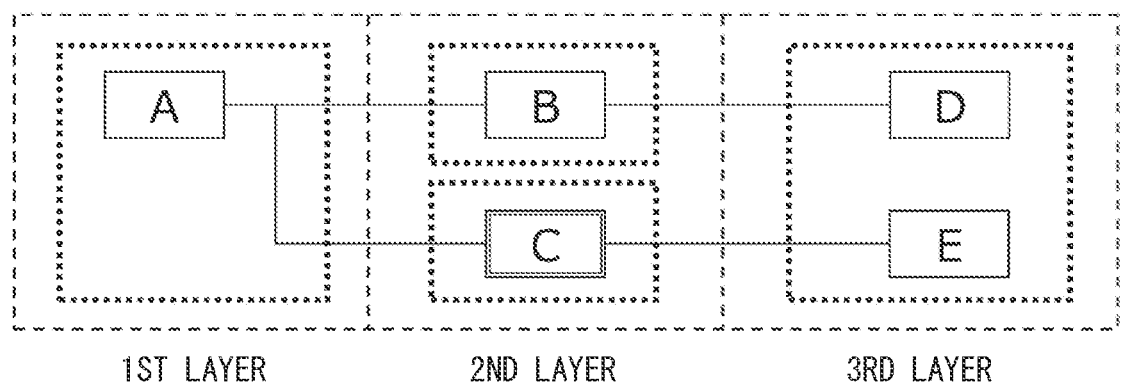
FIG. 15A and FIG. 15B each is a diagrams illustrating a correspondence between an individual location and a common location according to each embodiment.
Figure 15B:
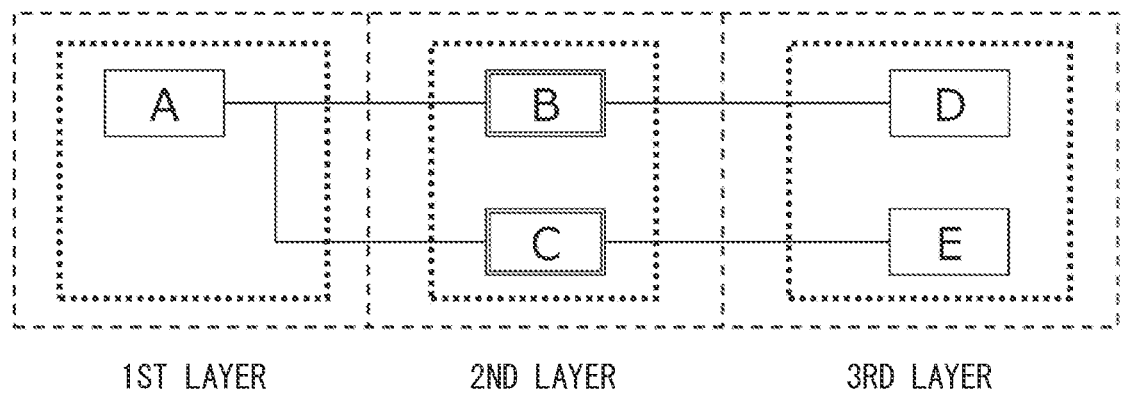

When the individual location and the commonized location are associated with one another according to the function of ECU, the platform (that is, AP, CP), the network connected to the ECU, or the like, the commonized location existing in a certain electronic control system may not exist in another electronic control system. For example, each of FIG. 15A and FIG. 15B indicates association of the individual location and commonized location in the electronic control system according to the defense layer and function of ECU. As shown in FIG. 15A, in the second layer, there is a commonized location associated with the ECU B that does not have an important protection resource and a commonized location associated with the ECU C that has an important protection resource. As shown in FIG. 15B, the ECUs in the second layer do not have an important protection resource. Thus, an ECU associated with the same commonized location as the ECU B of FIG. 15A does not exist in the electronic control system of FIG. 15B.

When the manufactured years and ranks of the vehicles are significantly different, as illustrated in FIG. 15A and FIG. 15B, a commonized location existing in a certain electronic control system may not exist in another electronic control system. Even in a case where a commonized location does not exist in some electronic control systems, the attack analysis device of the present embodiment can analyze a cyberattack received by the electronic control system by associating the individual location with the commonized location based on the defense layer and the function of ECU and performing an attack estimation, which is to be described later. Thus, the attack analysis device according to the present embodiment can analyze the cyberattacks received by the electronic control system having various configuration.

In the examples illustrated in FIG. 7 to FIG. 14, the individual location and the commonized location are associated with one another according to the parameters, such as the protection resource and the platform of each ECU in addition to the defense layer to which each ECU belongs. However, the individual location and the commonized location may be associated with one another without depending on the defense layer. For example, individual locations of multiple ECUs belonging to different defense layers may be associated with the same commonized location.

(3) Configuration of Attack Estimation Unit 200

Figure 16:
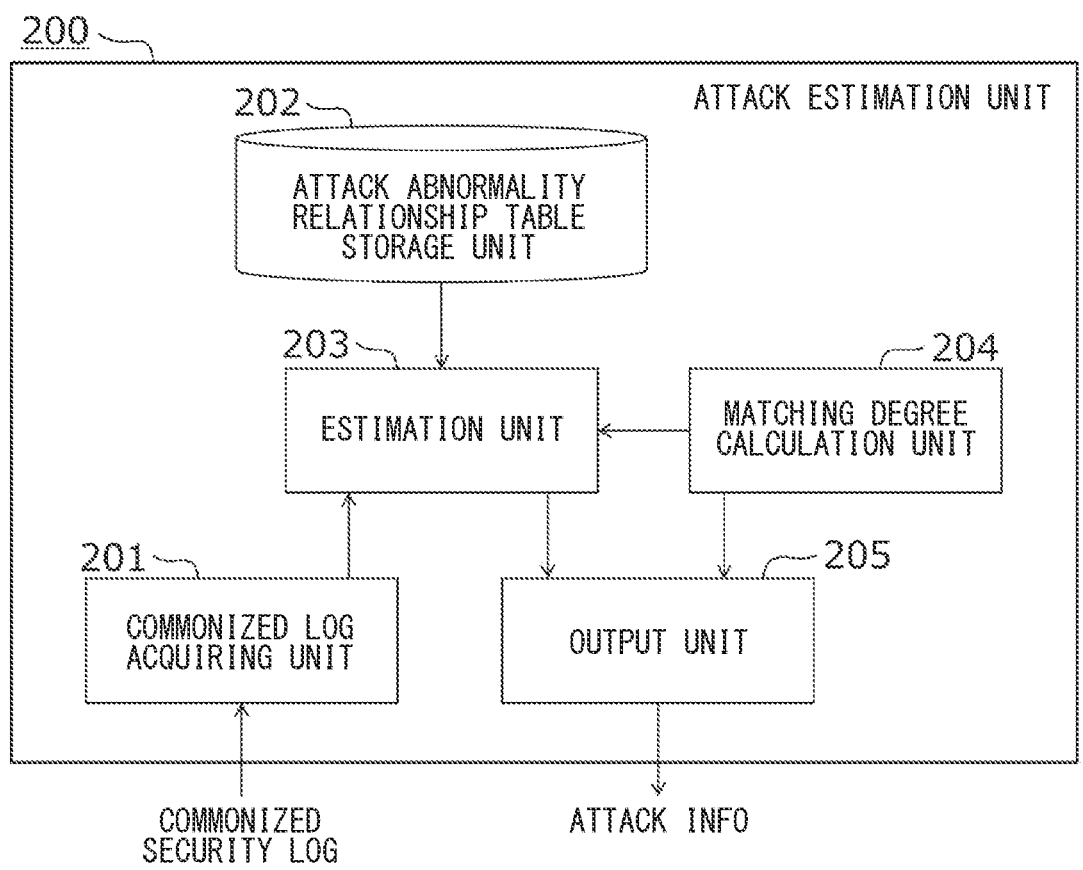
FIG. 16 is a block diagram illustrating a configuration example of an attack estimation unit according to the first and second embodiments.

The attack estimation unit 200 will be described with reference to FIG. 16. The attack estimation unit 200 includes a commonized log acquiring unit 201, an attack abnormality relationship table storage unit 202, an estimation unit 203, a matching degree calculation unit 204, and an output unit 205.

The commonized log acquiring unit 201 acquires a commonized security log from the commonized security log generation unit 100.

The attack abnormality relationship table storage unit 202 corresponds to an attack abnormality relationship information storage unit, and is provided by a storage that stores an attack abnormality relationship table. The attack abnormality relationship table corresponds to attack abnormality relationship information, and indicates a correspondence relationship among (i) attack information, (ii) estimation abnormality information, and (iii) estimation abnormality location information. The attack information indicates estimated attack that the electronic control system is possible to receive from outside. The estimation abnormality information indicates abnormality estimated to be occurred in the electronic control system. The estimation abnormality location information indicates occurrence location of estimated abnormality. Since the location indicated by the estimation abnormality location information is a location commonized between the electronic control system S and another electronic control system, the location is referred to as commonized estimation abnormality location information. The storage unit may store information indicating a correspondence relationship among the attack information, the estimation abnormality information, and the estimation abnormality location information in different forms other than the table.

The attack information includes a type of attack, and may further include any information related to the attack, such as a path of the attack and damage caused by the attack.

FIG. 17 is a diagram illustrating an example of the attack abnormality relationship table. The attack abnormality relationship table illustrated in FIG. 17 indicates, for each piece of attack information, abnormalities that occur when the electronic control system is subjected to the cyberattack and corresponding identification number of a commonized location where the abnormalities occur. As illustrated in FIG. 17, when a cyberattack is received, it is assumed that multiple abnormalities occur at respective locations. Thus, the attack abnormality relationship table may indicate a combination of multiple abnormalities that occur in response to reception of attack and locations of the multiple abnormalities. In the example illustrated in FIG. 17, the attack information includes the type of cyberattack (attacks A to X), an estimated start point location of the attack and an estimated target location of the attack when the cyberattack is received. Since the attack start point location and the attack target location are not locations specific to the configuration of the electronic control system S but are commonized locations common to other electronic control systems, these locations are referred to as commonized attack start point location and commonized attack target location. Information indicating commonized attack start point location and commonized attack target location are referred to as commonized attack start point location information and commonized attack target location information, respectively.

For example, when a cyberattack of type A is received, the electronic control system estimates that abnormality A, abnormality C, and abnormality D will occur at the commonized location [0x01]. The attack start point location of attack A is indicated by the identification number, and the attack target location is indicated by the identification number [0x01]. The attack start point location may be a location inside the electronic control system or may be outside the electronic control system. When the attack start point location is outside the electronic control system, the received cyberattack has started from the outside of the vehicle.

The estimation unit 203 estimates a cyberattack received by the electronic control system S using the attack abnormality relationship table. Specifically, the estimation unit 203 specifies, from the attack abnormality relationship table, a combination of the estimation abnormality information and the commonized estimation abnormality location information corresponding to a combination of the abnormality information included in the commonized security log acquired by the commonized log acquiring unit 201 and commonized abnormality location information. When a combination of estimation abnormality information and commonized estimation abnormality location information identical to the combination of the abnormality information and the commonized abnormality location information does not exist in the attack abnormality relationship table, the estimation unit 203 specifies the closest combination from the combinations of the estimation abnormality information and commonized estimation abnormality location information included in the attack abnormality relationship table. Then, the attack indicated by the attack information corresponding to the closest combination is estimated as the cyberattack received by the electronic control system.

Here, the expression of "corresponding to the combination" indicates that the combinations match with one another, be identical to one another, or be similar to one another.

In a case where the commonized security log includes an abnormality occurrence order and the number of abnormality occurrence times indicated by the abnormality information, the estimation unit 203 may further use these pieces of information when estimating the cyberattack. In this case, the attack abnormality relationship table includes the abnormality occurrence order and the number of abnormality occurrence times as the estimation abnormality information.

When multiple closest combinations (for example, attack A, attack B) exist, the estimation unit 203 may estimate the cyberattack received by the electronic control system as one of the closest combinations. Alternatively, the estimation unit 203 may specify an attack corresponding to the cyberattack received by the electronic control system does not exist in the attack abnormality relationship table.

In the example of FIG. 17, the attack information of the attack abnormality relationship table includes the attack type, the attack start point location, and the attack target location. Thus, the estimation unit 203 can estimate the attack type, the attack start point location, or the attack target location using the attack abnormality relationship table.

The estimation unit 203 may further estimate an abnormality that may occur in the electronic control system S in the future or an attack that will be received in the future based on a difference between a combination of the abnormality information and the commonized abnormality location information and a combination of the estimation abnormality information and the commonized estimated abnormality location. For example, when the number of abnormalities indicated by the abnormality information is smaller than the number of abnormalities indicated by the estimation abnormality information, among the abnormalities indicated by the estimation abnormality information, an abnormality that is not included in the abnormalities indicated by the abnormality information may occur in the future. Therefore, the estimation unit 203 estimates that the difference between the abnormalities indicated by the estimation abnormality information and the abnormalities indicated by the abnormality information is an abnormality that will occur in the electronic control system in the future. In such a case, the output unit 205, which is to be described later, may output, as future abnormality information, a difference between the abnormalities indicated by the estimation abnormality information and the abnormalities indicated by the abnormality information.

In addition, when the number of abnormalities indicated by the abnormality information is smaller than the number of abnormalities indicated by the estimation abnormality information, the abnormalities indicated by the abnormality information may be estimated as abnormalities occurred at a previous stage of the cyberattack, and there is a possibility that a further abnormality may occur due to receiving of the cyberattack in the future. Thus, the estimation unit 203 estimates that the estimated attack is an attack that the electronic control system S may receive in the future. In such a case, the output unit 205, which is to be described later, may output future attack information indicating that the attack indicated by the attack information may occur in the electronic control system in the future.

When the combination of the abnormality information and the commonized abnormality location information is not exactly the same as any one of the combinations of the estimation abnormality information and the commonized estimation abnormality location, the matching degree calculation unit 204 calculates a matching degree therebetween. For example, the matching degree is represented by a numerical value obtained by dividing a difference between the number of abnormalities indicated by the abnormality information and the number of abnormalities indicated by the number of abnormalities indicated by the abnormality information or indicated by the estimation abnormality information.

The output unit 205 outputs attack information indicating the attack estimated by the estimation unit 203 to the individual attack information generation unit 300, which is to be described later. As described above, the attack information includes the attack type information indicating the attack type estimated by the estimation unit 203, the commonized attack start point location information indicating the commonized location of start point of the attack, and the commonized attack target location information indicating the commonized location of attack target. The output unit 205 may further output the matching degree calculated by the matching degree calculation unit 204.

As described above, when the estimation unit 203 estimates an abnormality that will occur in the electronic control system in the future or an attack that the electronic control system S may be subjected to in the future, the output unit 205 may output future attack information or future abnormality information in addition to the attack information.

In a case where the attack estimated by the estimation unit 203 is related to an ECU having protection resource with high importance degree, the important protection resource is likely to be receive the attack. Thus, prompt response needs to be made for the estimated attack. When the type of estimated attack is an attack related to an ECU having protection resource with high importance degree, a flag may be set to the attack information or the attack information may be output in preference to other attack information, so that the individual attack information generation unit 300 or the estimation result verification unit 400 can analyze the attack information in preference to other attacks.

(4) Configuration of Individual Attack Information Generation Unit 300

Figure 18:
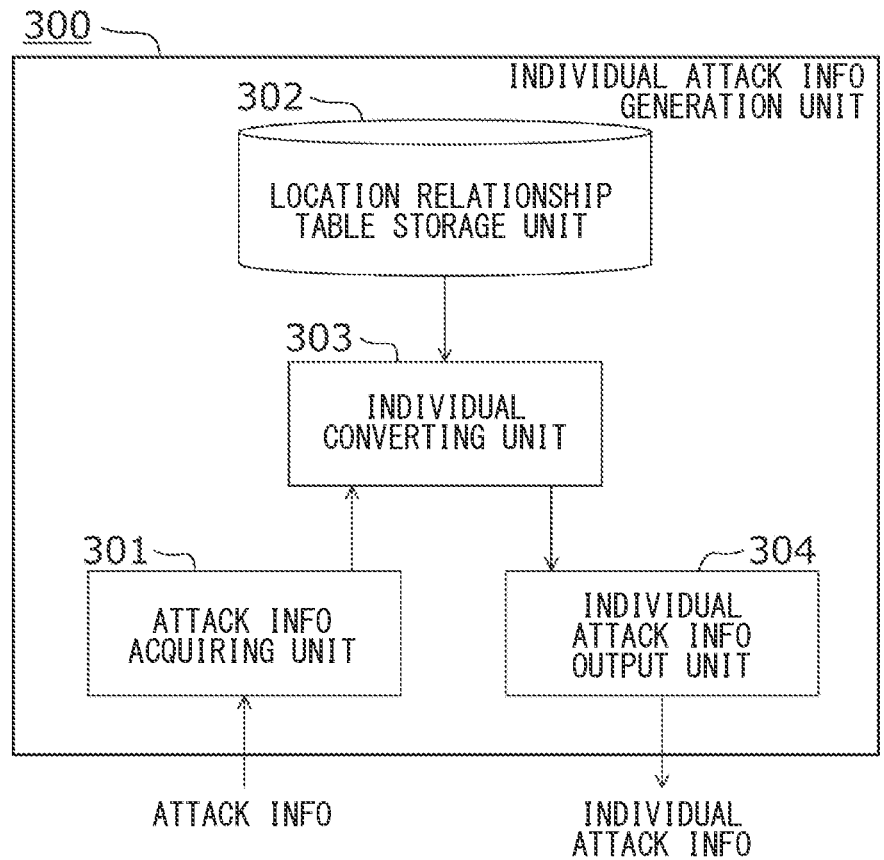
FIG. 18 is a block diagram illustrating a configuration example of an individual attack information generation unit according to the first and second embodiments.

The individual attack information generation unit 300 will be described with reference to FIG. 18. The individual attack information generation unit 300 includes an attack information acquiring unit 301, a location relationship table storage unit 302, an individualize converting unit 303, and an individual attack information output unit 304.

The attack information acquiring unit 301 acquires the attack information output from the attack estimation unit 200.

The location relationship table storage unit 302 stores the same location relationship table as the location relationship table stored in the location relationship table storage unit 102 of the commonized security log generation unit 100. As illustrated in FIG. 1, in the present embodiment, since the commonized security log generation unit 100 and the individual attack information generation unit 300 are provided in one attack analysis device 10, the location relationship table storage unit 102 and the location relationship table storage unit 302 may be configured by the same storage unit.

The individualize converting unit 303 converts the attack start point location indicated by the commonized attack start point location information and the attack target location indicated by the commonized attack target location information included in the attack information into individual locations of the electronic control system S using the locational relationship table. Specifically, the individualize converting unit 303 specifies the commonized location corresponding to the attack start point location in the location relationship table, and then specifies the individual location associated with the specified commonized location as the individual attack start point location. The individualize converting unit 303 specifies the commonized location corresponding to the commonized attack target location in the location relationship table, and then specifies the individual location associated with the specified commonized location as the individual attack target location. The location obtained by converting the commonized attack start point location into the individual location is the individual attack start point location, and the location obtained by converting the commonized attack target location into the individual location is the individual attack target location.

As shown in the location relationship table of FIG. 5, multiple individual numbers (identification numbers: 0x0004, 0x0005) are associated with the third layer (identification number: 0x03). Thus, when the commonized attack target location is the location of the third layer, it is impossible to specify the individual location corresponds to which one of ECU D and ECU E. The individualize converting unit 303 may specify the individual locations of entire ECUs included in the first layer as candidates for the individual target location. However, in this case, there is a possibility that a detailed attack target location cannot be specified. Therefore, the individualize converting unit 303 may convert the commonized attack start point location and the commonized attack target location into the individual attack start point location and the individual attack target location, which are the individual locations, with reference to the abnormality location included in the individual security log. When the abnormality location included in the individual security log is also included in the commonized security log output from the commonized security log generation unit 100 and is also included in the attack information, the individualize converting unit 303 can refer to the abnormality location included in the attack information. Alternatively, in the present embodiment, since the commonized security log generation unit 100 and the individual attack information generation unit 300 are provided in one attack analysis device 10, the individual attack information generation unit 300 may acquire the abnormality information from the individual security log acquired by the commonized security log generation unit 100.

The individual attack information output unit 304 outputs, to the estimation result verification unit 400, the attack information and the individual attack information including (i) the individual attack start point location and (ii) the individual attack target location, which are converted by the individualize converting unit 303. In a case where the matching degree and the future abnormality information are output from the attack estimation unit 200 in addition to the attack information, the individual attack information may include these pieces of information.

(5) Configuration of Estimation Result Verification Unit 400

Figure 19:
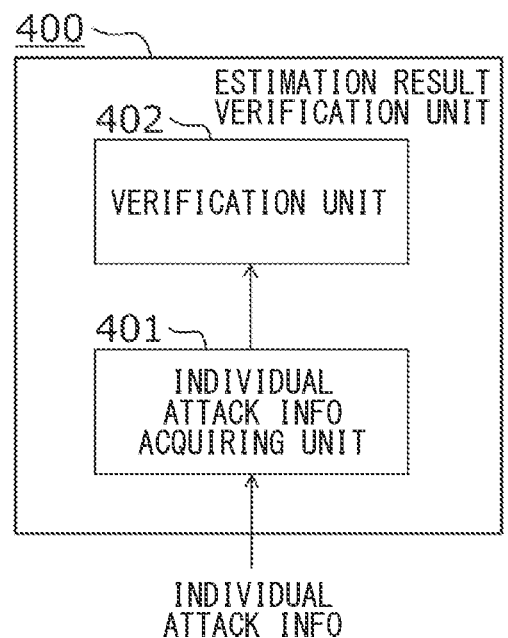
FIG. 19 is a block diagram illustrating a configuration example of an estimation result verification unit according to the first and second embodiments.

The estimation result verification unit 400 will be described with reference to FIG. 19. The estimation result verification unit 400 includes an individual attack information acquiring unit 401 and a verification unit 402.

The individual attack information acquiring unit 401 acquires the individual attack information output from the individual attack information generation unit 300.

The verification unit 402 verifies the content included in the individual attack information. For example, the verification unit 402 verifies the accuracy of estimation result of the attack estimation unit 200 based on the matching degree included in the individual attack information. For example, when the matching degree is lower than a predetermined matching degree, the verification unit 402 determines that the estimation result by the attack estimation unit 200 is not correct. Alternatively, the verification unit 402 may instruct the attack estimation unit 200 to perform analysis again with consideration of past estimation result and future estimation result of the individual security log.

The verification unit 402 may further verify the accuracy of the attack abnormality relationship table based on the matching degree. For example, in a case where the estimation result having a low matching degree consecutively occur, the verification unit 402 may determine that the association between the estimation abnormality information and the commonized estimation abnormality location included in the attack abnormality relationship table is not accurate, and the table needs to be reset or updated.

The verification unit 402 may verify whether the individual attack start point location and the individual attack target location included in the individual attack information are correct. For example, the individual security log may include information of an IP address (for example, a transmission source and a transmission destination) of data that causes an abnormality and is received by the ECU before the security sensor detects the abnormality. In such a case, there is a high possibility that a transmission destination location "indicating" a transmission destination of data of an IP address corresponds to the attack target location, and a transmission source location "indicating" a transmission source corresponds to the attack start point location. Thus, when the IP address is included in the individual security log, the verification unit 402 verifies whether the transmission source location of the data indicated by the IP address matches the individual attack start point location included in the individual attack information. Similarly, the verification unit 402 verifies whether the transmission destination location of the data indicated by the IP address matches the individual attack target location included in the individual attack information.

When the individual attack start point location does not match the transmission source of data, the verification unit 402 may update the individual attack start point location to the transmission source location of the data. Similarly, when the individual attack target location does not match the transmission destination of data, the verification unit 402 may update the attack target location to the transmission destination location of the data.

The term "indicate" is not limited to a case of directly indicating a transmission source location or a transmission destination location, and may be information for specifying a location, such as an IP address.

(6) Operation of Attack Analysis Device 10

Figure 20:
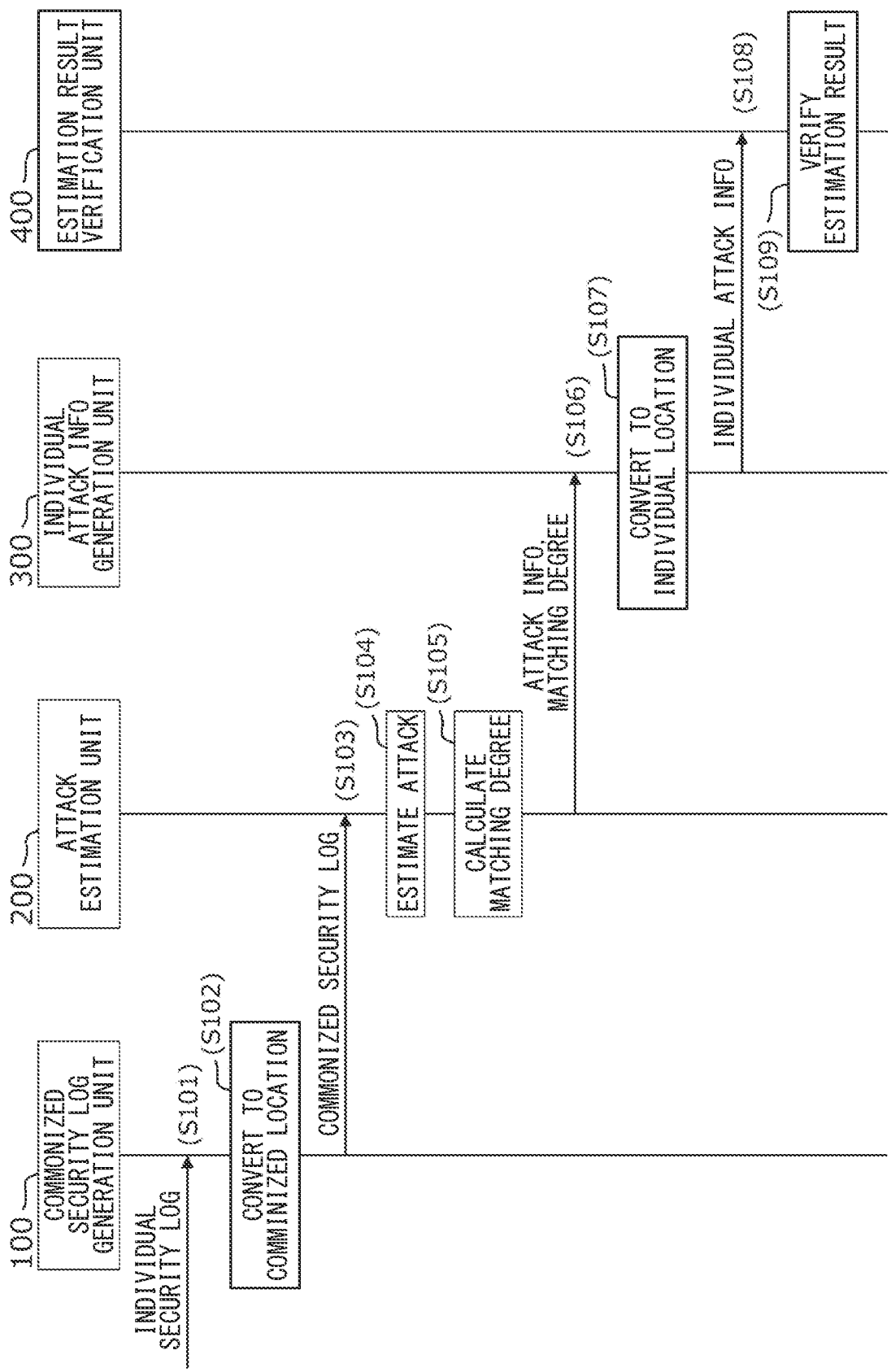
FIG. 20 is a flowchart showing an operation of the attack analysis system according to the first and second embodiments.

The operation of the attack analysis device 10 will be described with reference to FIG. 20. The operation of the attack analysis device 10 can also be regarded as the operation of the attack analysis system 1. FIG. 20 not only shows an attack analysis method executed by the attack analysis device 10 or the attack analysis system 1, but also shows a processing procedure of an attack analysis program executable by the attack analysis device 10 or the attack analysis system 1. The process is not limited to the order illustrated in FIG. 20. That is, the order may be properly changed as long as there is no restriction such as a relationship in which a result of a previous step is used in a subsequent step.

In S101, the commonized security log generation unit 100 acquires an individual security log, which includes abnormality information and abnormality location, from the ECU included in the electronic control system S.

In S102, the commonize converting unit 103 of the commonized security log generation unit 100 converts the abnormality location included in the individual security log into a commonized abnormality location that is a location common to the electronic control system S and another electronic control system.

In S103, the output unit 104 outputs the commonized security log including the abnormality information and the commonized abnormality location information indicating the commonized abnormality location converted in S102.

In S104, in response to acquiring the commonized security log, the attack estimation unit 200 estimates a cyberattack to be received by the electronic control system S using the attack abnormality relationship table. At this time, the attack estimation unit 200 may estimate the type of attack, the commonized attack start point location, and the commonized attack target location.

When there is a difference between the estimation abnormality information stored in the attack abnormality relationship table and the abnormality information included in the commonized security log, the matching degree calculation unit 204 of the attack estimation unit 200 calculates, in S105, the matching degree between the estimation abnormality information and the abnormality information.

In S106, the attack information output unit 205 outputs the attack information, which includes attack type information indicating the estimated attack type, the commonized attack start point location information, and the commonized attack target location information, together with the matching degree.

In response to acquiring the attack information, the individual attack information generation unit 300 converts, in S107, the attack start point location and the attack target location included in the attack information into the individual attack start point location and the individual attack target location, which are the individual locations of the electronic control system.

In S108, the individual attack information generation unit 300 outputs the attack type information and the individual attack information, which includes the converted individual attack start point location and the converted individual attack target location.

Upon acquiring the individual attack information, the estimation result verification unit 400 verifies the attack estimation result included in the individual attack information in S109.

(7) Conclusion

As described above, according to the attack analysis device 10 of the present disclosure, when an electronic control system is subjected to a cyberattack, an individual location that is a location specific to the electronic control system is converted into a commonized location common to other electronic control systems, and then the type of cyberattack is estimated. Thus, when multiple electronic control systems having different configurations exist, it is possible to analyze an attack by applying the attack analysis system of the present disclosure to any of the electronic control systems.

According to the attack analysis device 10 of the present disclosure, since it is not necessary to provide a tool for estimating and analyzing a cyberattack for each of a large number of ECUs constituting an electronic control system, it is possible to facilitate management of a device and a program for attack analysis and reduce a processing load required for attack analysis.

Furthermore, the device and the system can be applied even when the number and configuration of the ECUs configuring the electronic control system are changed in the future.

2. Second Embodiment

In the second embodiment, the attack analysis device includes the attack estimation unit 200, and at least a part of the commonized security log generation unit 100, the individual attack information generation unit 300, and the estimation result verification unit 400 is provided in a device different from the attack analysis device. The following description will focus on differences from the first embodiment. The configurations and operations of the commonized security log generation unit 100, the attack estimation unit 200, the individual attack information generation unit 300, and the estimation result verification unit 400 are similar to those in the first embodiment, and thus detailed description thereof will be omitted.

Figure 21:
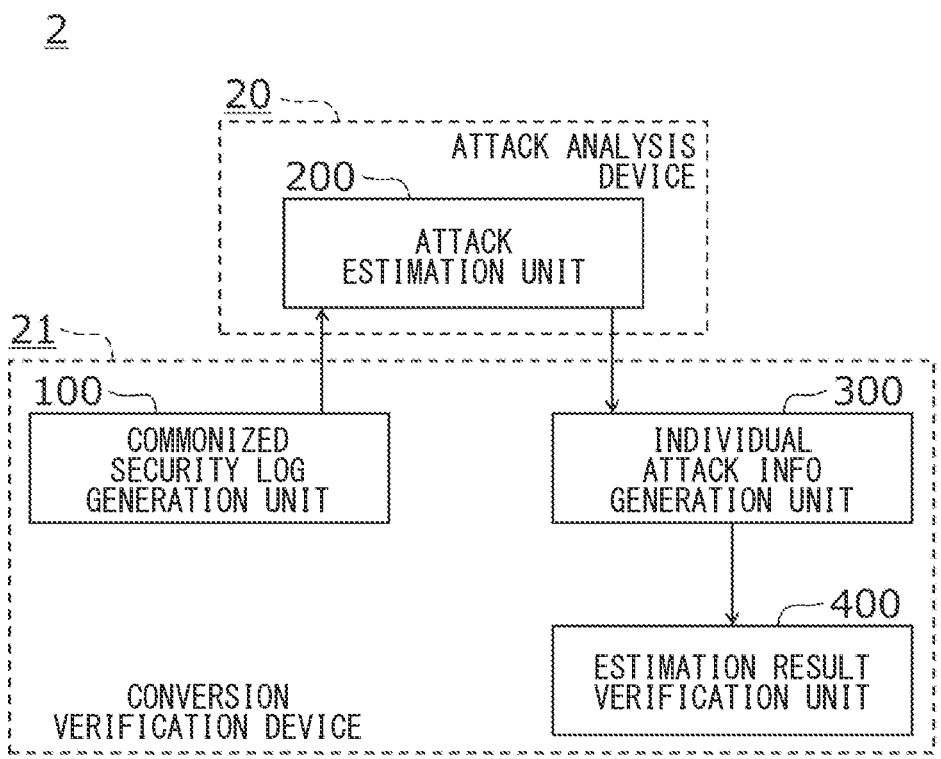
FIG. 21 is a block diagram illustrating a configuration example of an attack analysis system according to the second embodiment.

FIG. 21 is a diagram illustrating an example of an attack analysis system including the attack analysis device 20 according to the present embodiment. In the example of FIG. 21, the attack analysis device 20 includes only the attack estimation unit 200. The commonized security log generation unit 100, the individual attack information generation unit 300, and the estimation result verification unit 400 are provided in a conversion verification device 21. The attack analysis device 20 and the conversion verification device 21 are collectively referred to as an attack analysis system 2.

Figure 22:
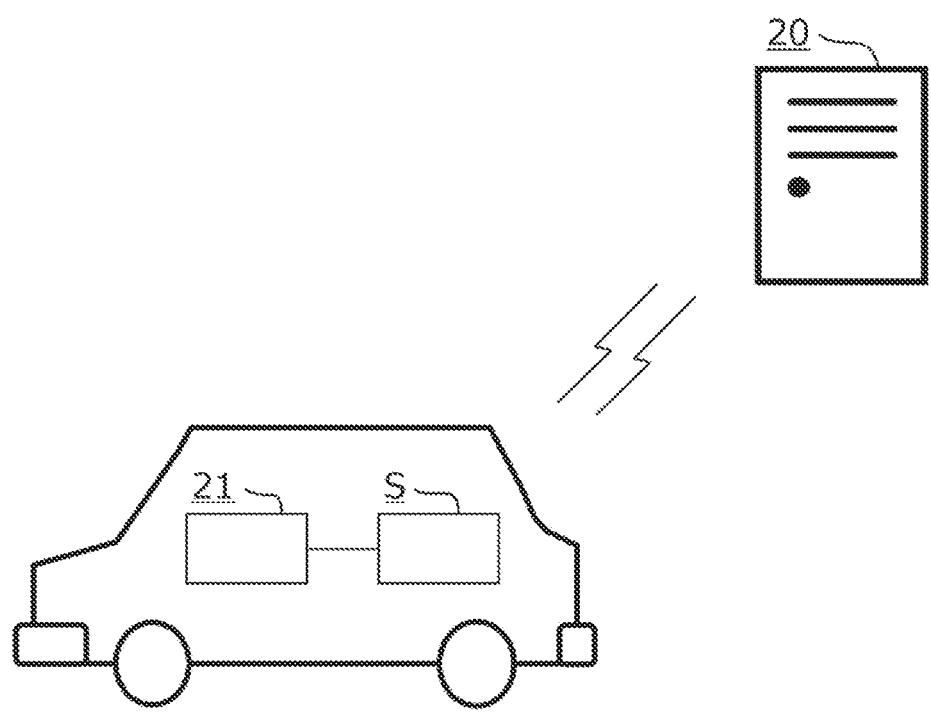
FIG. 22 is a diagram illustrating an attack analysis device according to the second embodiment.

FIG. 22 is a diagram illustrating the attack analysis device 20 according to the present embodiment. As illustrated in FIG. 22, in the present embodiment, the server device disposed outside the vehicle corresponds to the attack analysis device 20, and the conversion verification device 21 is mounted on the vehicle.

In the present embodiment, the commonized security log output from the commonized security log generation unit 100 is transmitted to the attack estimation unit 200 via the wireless communication network. Similarly, the attack information output from the attack estimation unit 200 is transmitted to the individualize converting unit 303 via the wireless communication network. Although not illustrated in FIG. 21, each of the attack analysis device 20 and the conversion verification device 21 may include a wireless communication unit and an antenna, or each of the output unit 104 of the commonized security log generation unit 100 and the attack information acquiring unit 301 of the individual attack information generation unit 300 may have a function of wireless communication.

Among the processes executed by the attack analysis system, the process of estimating the cyberattack received by the electronic control system S, that is, the process in the attack estimation unit 200 requires the highest processing load. Thus, by providing the server device with the attack analysis device 20 including the attack estimation unit 200, it is possible to significantly reduce the processing load in the vehicle.

(1) Modification Examples of Second Embodiment

Figure 23:
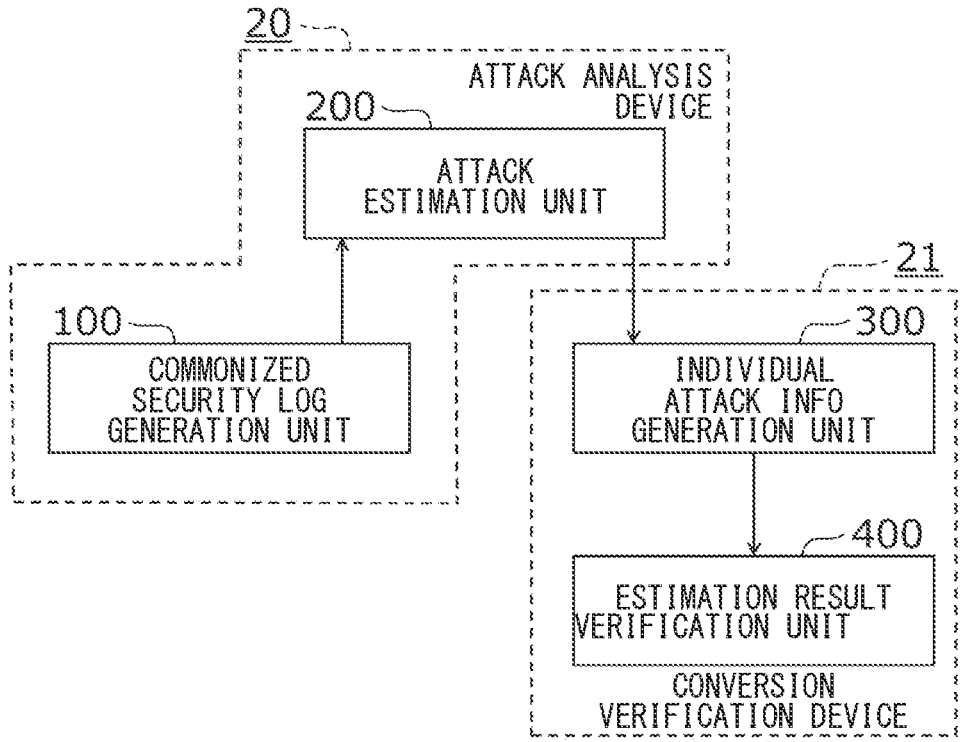
FIG. 23 is a diagram illustrating an attack analysis device according to a modification of the second embodiment.

FIG. 23 illustrates a first modification of second embodiment. In the present modification, the attack analysis device 20 includes the commonized security log generation unit 100 in addition to the attack estimation unit 200. In this case, similarly to the configuration illustrated in FIG. 22, the attack analysis device 20 may be provided by a server device. Alternatively, the attack analysis device 20 may be a device mounted on a vehicle, and the conversion verification device 21 may be implemented by a server device. In this case, verification of the attack estimation result by the attack estimation unit 200 is performed in the server device. In the server device, since the estimation results of the cyberattacks in multiple electronic control systems are verified, it is possible to determine whether it is necessary to reset or update the attack abnormality relationship table by comparing the estimation results of different electronic control systems.

Figure 24:
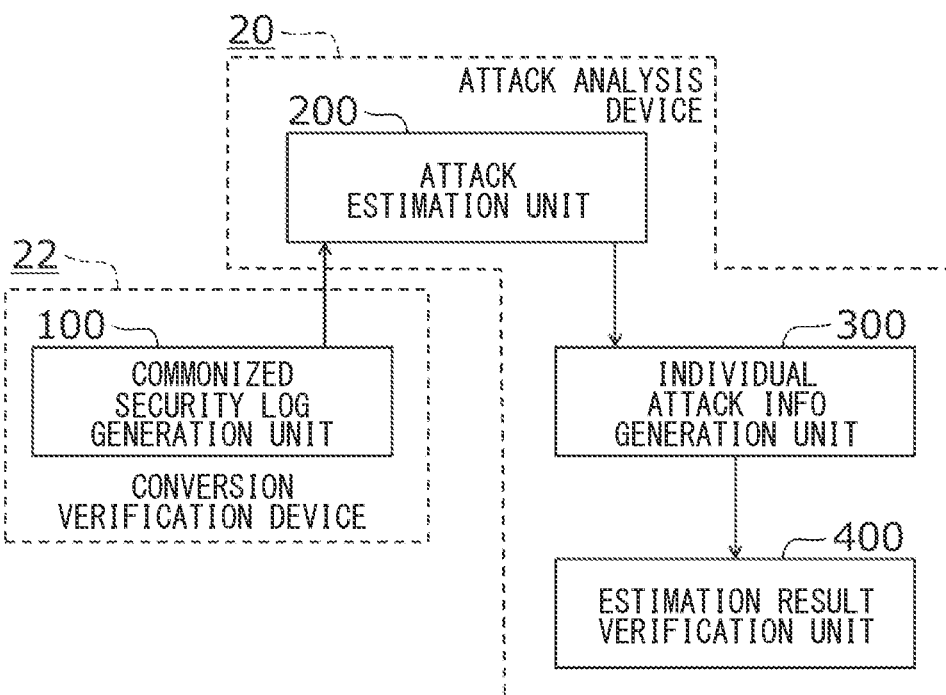
FIG. 24 is a diagram illustrating an attack analysis device according to a modification of the second embodiment.

FIG. 24 illustrates a second modification of second embodiment. In the present modification, the attack analysis device 20 includes the individualize converting unit 303 and the estimation result verification unit 400 in addition to the attack estimation unit 200. The commonized security log generation unit 100 is provided in a conversion device 22. In the present modification, the attack analysis device 20 including the attack estimation unit 200 and the estimation result verification unit 400 requires a high processing load and thus may be implemented by a server device. The configuration of the present disclosure is not limited to this configuration.

The features of the attack analysis device are described in each embodiment of the present disclosure as above.

The terms used in the above embodiments are examples, the terms may be replaced with synonymous terms or terms including synonymous functions.

In the block diagrams used to describe the embodiments, the configurations of the devices are classified and organized for each function. The blocks representing the respective functions may be implemented by any combination of hardware or software. Since the block diagrams illustrate the functions, the block diagrams also correspond to the method and program that implement the method.

Functional blocks that can be understood as processes, flows, and methods described in the respective embodiments may be changed in order as long as there is no restriction such as a relationship in which results of preceding other steps are used in subsequent step.

The terms "first", "second", or "N" (N is an integer) used in each embodiment and the present disclosure are used to distinguish two or more configurations and methods of the same type, it does not limit the order or superiority.

Each of the embodiments described vehicular attack analysis device for analyzing cyberattack on an electronic control system mounted on a vehicle. The present disclosure is not limited to vehicle use. The present disclosure may include a dedicated or general-purpose device other than a vehicular device.

Embodiments of the attack analysis device of the present disclosure include the following. Examples of the present disclosure as a component may include a semiconductor device, an electronic circuit, a module, and a microcomputer. Examples of the present disclosure as a semi-finished product may include an electronic control unit (ECU), and a system board. Examples of the present disclosure as a finished component may include a smartphone, a tablet computer, a personal computer (PC), a work station, and a server. Other examples of the present disclosure may include a device having communication function, such as a video camera, a still camera, or a car navigation system.

Necessary functions such as an antenna or a communication interface may be properly added to the attack analysis device.

The attack analysis device according to the present disclosure may be used for the purpose of providing various services, especially when used on the server side. Such provision of service may use the attack analysis device according to the present disclosure, the method according to the present disclosure, or/and execution of the program according to the present disclosure.

The present disclosure may be implemented by not only dedicated hardware having the configurations and functions described in each embodiment but also as a combination of a program recorded in a storage medium such as a memory or a hard disk and provided to implement the present disclosure, and general-purpose hardware having a dedicated or general-purpose CPU, which can execute the program, and having a memory and the like.

A program may be stored in a non-transitory tangible storage medium of a special-purpose or general-purpose hardware (e.g., computer), such as (i) an external storage (e.g., hard disk, USB memory, CD/BD), or (ii) an internal storage (e.g., RAM, ROM). Such a program may be downloaded from the server and provided to the special-purpose or general-purpose hardware via the storage medium or without using the storage medium through a communication link. As the program is upgraded, the corresponding latest function can be continually provided.

The attack analysis device according to the present disclosure is mainly applied as a device that analyzes a cyber-attack received by an electronic control system mounted on an automobile vehicle. Alternatively, the attack analysis device according to the present disclosure may be applied as a device that analyzes an attack on a system, which is not mounted on an automobile vehicle.

What is claimed is:

1. An attack analysis device of a vehicle system comprising:
    a computer and memory configured to:
        acquire a commonized security log, the commonized security log including abnormality information and commonized abnormality location information, the abnormality information indicating an abnormality detected in an electronic control system, the electronic control system including multiple electronic control units and layers corresponding to different security levels of the electronic control system, the commonized abnormality location information indicating a commonized abnormality location generated by converting an abnormality location, which is a location of one of the multiple electronic control units where the abnormality is detected as occurring, to one of a plurality of commonized locations that are commonized between the electronic control system and a different electronic control system, which are generated based on a security level corresponding to a layer of the location of the one of the multiple electronic control units and include a commonized location generated by treating two or more of the multiple electronic control units included in the electronic control system as a single location;
        store attack abnormality relationship information in advance, the attack abnormality relationship information indicating a set of correspondence relationships each being a correspondence relationship among (i) attack information indicating an attack possible to be received by the electronic control system, (ii) an estimation abnormality information indicating an abnormality estimated to be occurred when the attack is received, and (iii) commonized estimation abnormality location information indicating a commonized estimation abnormality location, which is a location of the abnormality estimated to be occurred when the electronic control system receives the attack and which is expressed using the plurality of commonized locations;
        estimate the attack received by the electronic control system from a combination of the estimation abnormality information and the commonized estimation abnormality location information that corresponds to a combination of the abnormality information and the commonized abnormality location information; and
        output, based on estimating the attack, the attack information corresponding to the estimated attack.

2. The attack analysis device according to claim 1, wherein the plurality of commonized locations include a location commonized according to a content of a protection resource to be protected by one or more of the multiple electronic control units.

3. The attack analysis device according to claim 1, wherein the plurality of commonized locations include a location commonized according to an importance of a protection resource to be protected by one or more of the multiple electronic control units.

4. The attack analysis device according to claim 1, wherein
    the plurality of commonized locations include a location commonized corresponding to a platform of one or more of the multiple electronic control units.

5. The attack analysis device according to claim 1, wherein
    the plurality of commonized locations include a location commonized corresponding to whether one or more of the multiple electronic control units is a physical electronic control unit or a virtually implemented electronic control unit.

6. The attack analysis device according to claim 1, wherein
    the plurality of commonized locations include a location commonized corresponding to a network to which one or more of the multiple electronic control units is connected.

7. The attack analysis device according to claim 1, wherein
    the attack information includes attack type information indicating a type of the attack.

8. The attack analysis device according to claim 1, wherein
    the attack information includes commonized attack start point location information indicating a start point location of the attack and commonized attack target location information indicating a target location of the attack.

9. The attack analysis device according to claim 1, wherein
    the computer and memory are further configured to estimate, as the attack received by the electronic control system, the attack indicated by the attack information in the correspondence relationship that, among the set of correspondence relationships, has the combination of the estimation abnormality information and the commonized estimation abnormality location information closest in similarity to the combination of the abnormality information and the commonized abnormality location information.

10. The attack analysis device according to claim 9, wherein the computer and memory are further configured to:
    calculate a matching degree between the combination of the abnormality information and the commonized abnormality location information and the combination of the estimation abnormality information and the commonized estimation abnormality location information; and
    output the matching degree.

11. The attack analysis device according to claim 1, wherein the computer and memory are further configured to:
    estimate, as an abnormality to be occurred in the electronic control system in future, a difference between the abnormality indicated by the abnormality information and the abnormality indicated by the estimation abnormality information; and
    output future abnormality information indicating the difference.

12. The attack analysis device according to claim 1, wherein the electronic control system is equipped to a moving object, the moving object includes an additional computer and memory that generate the commonized security log;

the attack analysis device is a server device disposed outside the moving object; and the computer and memory are further configured to acquire the commonized security log generated by the additional computer and memory.

13. The attack analysis device according to claim 1, wherein the computer and memory are further configured to:

generate the commonized security log;

acquire the generated commonized security log; and acquire an individual log that includes the abnormality information and abnormality location information indicating an abnormality location of the abnormality;

store location relationship information indicating a correspondence relationship between individual locations and the commonized locations, the individual location being a location of each of the multiple electronic control units included in the electronic control system; and convert the abnormality location to the commonized abnormality location using the location relationship information.

14. The attack analysis device according to claim 13, wherein the electronic control system is equipped to a moving object;

the attack analysis device is a server device disposed outside the moving object; and the computer and memory are further configured to:

acquire identification information for specifying the electronic control system in addition to the commonized security log; and specify the location relationship information to be used based on the identification information.

15. The attack analysis device according to claim 1, wherein the attack information includes commonized attack start point location information indicating a start point location of the estimated attack and expressed using the plurality of commonized locations and commonized attack target location information indicating a target location of the estimated attack and expressed using the commonized locations; the computer and memory are further configured to:

store location relationship information indicating a correspondence relationship between the plurality of commonized locations and individual locations, wherein each of the individual locations that indicates a location of each of the multiple electronic control units included in the electronic control system; and convert the start point location indicated by the commonized attack start point location information to an individual attack start point location specific to the electronic control system and convert the target location indicated by the commonized attack target location information to an individual attack target location specific to the electronic control system.

16. The attack analysis device according to claim 15, wherein the commonized security log further includes transmission source location indicating a transmission source of data that causes the abnormality; and the computer and memory are further configured to verify whether the individual attack start point location matches the transmission source location, and update the individual attack start point location to the transmission source location in response to determining that the individual attack start point location does not match the transmission source location.

17. The attack analysis device according to claim 15, wherein the commonized security log further includes transmission destination location indicating a transmission destination of data that causes the abnormality;

the computer and memory are further configured to verify whether the individual attack target location matches the transmission destination location, and update the individual attack target location to the transmission destination location in response to determining that the individual attack target location does not match the transmission destination location.

18. An attack analysis method executed by an attack analysis device of a vehicle system that analyzes an attack received by an electronic control system, the attack analysis method comprising:

acquiring a commonized security log that includes abnormality information and commonized abnormality location information, the abnormality information indicating an abnormality detected in the electronic control system, the electronic control system including multiple electronic control units and layers corresponding to different security levels of the electronic control system, the commonized abnormality location information indicating a commonized abnormality location generated by converting an abnormality location, which is a location of one of the multiple electronic control units where the abnormality is detected as occurring, to one of a plurality of commonized locations that are commonized between the electronic control system and a different electronic control system, which are generated based on a security level corresponding to a layer of the location of the one of the multiple electronic control units and include a commonized location generated by treating two or more of the multiple electronic control units included in the electronic control system as a single location;

acquiring attack abnormality relationship information, the attack abnormality relationship information indicating a set of correspondence relationships each being a correspondence relationship among (i) attack information indicating an attack possible to be received by the electronic control system, (ii) an estimation abnormality information indicating an abnormality estimated to be occurred when the attack is received, and (iii) commonized estimation abnormality location information indicating a commonized estimation abnormality location, which is a location of the abnormality estimated to be occurred when the electronic control system receives the attack and which is expressed using the plurality of commonized locations;

estimating the attack received by the electronic control system from a combination of the estimation abnormality information and the commonized estimation abnormality location information that, which corresponds to a combination of the abnormality information and the commonized abnormality location information; and outputting, based on estimating the attack, the attack information corresponding to the estimated attack.

19. A computer-readable non-transitory storage medium, the storage medium storing instructions of an attack analysis program to be executed by an attack analysis device that analyzes an attack received by an electronic control system, the instructions of the attack analysis program comprising:

acquiring a commonized security log that includes abnormality information and commonized abnormality location information, the abnormality information indicating an abnormality detected in the electronic control system, the electronic control system including multiple electronic control units and layers corresponding to different security levels of the electronic control system, the commonized abnormality location information indicating a commonized abnormality location generated by converting an abnormality location, which is a location of one of the multiple electronic control units where the abnormality is detected as occurring, to one of a plurality of commonized locations that are commonized between the electronic control system and a different electronic control system, which are generated based on a security level corresponding to a layer of the location of the one of the multiple electronic control units and include a commonized location generated by treating two or more of the multiple electronic control units included in the electronic control system as a single location;

acquiring attack abnormality relationship information, the attack abnormality relationship information indicating a set of correspondence relationships each being a correspondence relationship among (i) attack information indicating an attack possible to be received by the electronic control system, (ii) an estimation abnormality information indicating an abnormality estimated to be occurred when the attack is received, and (iii) commonized estimation abnormality location information indicating a commonized estimation abnormality location, which is a location of the abnormality estimated to be occurred when the electronic control system receives the attack and which is expressed using the plurality of commonized locations;

estimating the attack received by the electronic control system from a combination of the estimation abnormality information and the commonized estimation abnormality location information that corresponds to a combination of the abnormality information and the commonized abnormality location information; and outputting, based on estimating the attack, the attack information corresponding to the estimated attack.

20. An attack analysis method executed by an attack analysis system, the attack analysis system including:

a computer and memory that analyzes an attack received by an electronic control system including multiple electronic control units and layers corresponding to different security levels of the electronic control system, wherein the computer and memory are configured to store, in advance, attack abnormality relationship information, the attack abnormality relationship information indicating a set of correspondence relationships each being a correspondence relationship among (i) attack information indicating an attack possible to be received by the electronic control system, the attack information including commonized attack start point location information indicating a start point location of the attack and commonized attack target location information indicating a target location of the attack (ii) an estimation abnormality information indicating an abnormality estimated to be occurring when the attack is received, and (iii) commonized estimation abnormality location information indicating a commonized estimation abnormality location, which is a location of the abnormality estimated to be occurring when the electronic control system receives the attack and which is expressed using a plurality of commonized locations that are commonized between the electronic control system and a different electronic control system, which are generated based on a security level corresponding to a layer of the location of the one of the multiple electronic control units and include a commonized location generated by treating two or more of the multiple electronic control units included in the electronic control system as a single location, the attack analysis method comprising:

acquiring abnormality information indicating an abnormality detected in the electronic control system;

acquiring an abnormality location which is a location of one of the multiple electronic control units where the abnormality is occurred;

converting the abnormality location to a commonized abnormality location using location relationship information, the location relationship information indicating a correspondence relationship between individual locations and the plurality of commonized locations, each of the individual locations being a location of each of the multiple electronic control units included in the electronic control system;

acquiring a commonized security log including the abnormality information and commonized abnormality location information indicating the commonized abnormality location;

estimating the attack received by the electronic control system from a combination of the estimation abnormality information and the commonized estimation abnormality location information that corresponds to a combination of the abnormality information and the commonized abnormality location information;

outputting, based on estimating the attack, the attack information corresponding to the estimated attack;

converting, using the location relationship information, the target location indicated by the commonized attack target location information to an individual attack target location specific to the electronic control system; and converting, using the location relationship information, the start point location indicated by the commonized attack start point location information to an individual attack start point location specific to the electronic control system.

21. The attack analysis device according to claim 1, wherein the plurality of commonized locations include locations commonized between the electronic control system and the different electronic control system according to protection resource to be protected by the multiple electronic control units.

22. The attack analysis device according to claim 1, wherein the plurality of commonized locations include
(i) a location commonized corresponding to a platform of the corresponding electronic control unit, or
(ii) a location commonized according to whether the corresponding electronic control unit is a physical electronic control unit or a virtually implemented electronic control unit.

23. The attack analysis device according to claim 1, wherein the location generated by treating two or more of the multiple electronic control units included in the electronic control system as a single location is set when the two or more of the multiple electronic control units are connected to the same network among multiple networks equipped to a vehicle.

24. The attack analysis device according to claim 1, wherein the attack information, which is included in the attack abnormality relationship information and output by the output unit, includes information indicating a path of the attack using the plurality of commonized locations, and the information indicating the path of attack includes:
- information indicating a location of a start point of attack, the location of the start point being expressed using the plurality of commonized locations;
- information indicating a location of an attack target, the location of the attack target being expressed using the plurality of commonized locations; and
- information indicating a via location of the path from the location of the start point of attack to the location of the attack target, the via location being expressed using the plurality of commonized locations.

\* \* \* \* \*